United States Patent
Ye et al.

(10) Patent No.: US 11,356,684 B2
(45) Date of Patent: Jun. 7, 2022

(54) METHOD AND SYSTEM FOR SIGNALING CHROMA QUANTIZATION PARAMETER TABLE

(71) Applicant: ALIBABA GROUP HOLDING LIMITED, Grand Cayman (KY)

(72) Inventors: Yan Ye, San Mateo, CA (US); Zhao Wang, Beijing (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

(21) Appl. No.: 16/933,262

(22) Filed: Jul. 20, 2020

(65) Prior Publication Data

US 2021/0067791 A1 Mar. 4, 2021

Related U.S. Application Data

(60) Provisional application No. 62/894,673, filed on Aug. 30, 2019.

(51) Int. Cl.
| | |
|---|---|
| *H04N 19/44* | (2014.01) |
| *H04N 19/126* | (2014.01) |
| *H04N 19/184* | (2014.01) |
| *H04N 19/186* | (2014.01) |
| *H04N 19/46* | (2014.01) |

(52) U.S. Cl.
CPC ........... *H04N 19/44* (2014.11); *H04N 19/126* (2014.11); *H04N 19/184* (2014.11); *H04N 19/186* (2014.11); *H04N 19/46* (2014.11)

(58) Field of Classification Search
CPC .... H04N 19/124; H04N 19/70; H04N 19/186; H04N 19/184
See application file for complete search history.

(56) References Cited

U.S. PATENT DOCUMENTS

| | | | |
|---|---|---|---|
| 2008/0043033 A1* | 2/2008 | Winger | H04N 1/628 |
| | | | 348/E9.04 |
| 2009/0257506 A1 | 10/2009 | Auyeung | |
| 2013/0188693 A1 | 7/2013 | Xu et al. | |
| 2014/0003497 A1 | 1/2014 | Sullivan et al. | |
| 2018/0000727 A1* | 1/2018 | Willinsky | A61K 31/352 |

(Continued)

FOREIGN PATENT DOCUMENTS

| | | | | |
|---|---|---|---|---|
| WO | WO 2017/206826 A1 | 12/2017 | | |
| WO | WO-2021006559 A1 * | 1/2021 | ............. | H04N 19/18 |

OTHER PUBLICATIONS

"Requirements for a Future Video Coding Standard v5," International Organisation for Standardisation, Torino, IT, 14 pages (2017).

(Continued)

*Primary Examiner* — Daniel Chang
(74) *Attorney, Agent, or Firm* — Finnegan, Henderson, Farabow, Garrrett & Dunner, LLP

(57) ABSTRACT

The present disclosure provides method and systems for signaling chroma quantization parameter (QP) table. According to some disclosed embodiments, the methods include: receiving a bitstream of video data; determining whether a luma-to-chroma QP mapping table is signaled, based on a first flag in the bitstream; and in response to the first flag being a first value, determining the signaled luma-to-chroma (P mapping table based on the bitstream.

15 Claims, 33 Drawing Sheets

(56) References Cited

U.S. PATENT DOCUMENTS

| | | | |
|---|---|---|---|
| 2019/0124330 A1 | 4/2019 | Chien et al. | |
| 2020/0260070 A1* | 8/2020 | Yoo | H04N 19/176 |
| 2020/0382799 A1* | 12/2020 | Chernyak | H04N 19/44 |
| 2020/0413101 A1* | 12/2020 | Ramasubramonian | H04N 19/186 |
| 2021/0006792 A1* | 1/2021 | Han | H04N 19/96 |
| 2021/0058620 A1* | 2/2021 | Ramasubramonian | H04N 19/44 |
| 2021/0266552 A1* | 8/2021 | Kotra | H04N 19/124 |

OTHER PUBLICATIONS

Bossen et al., "AHG15: Flexible luma-to-chroma quantization parameter tables," JVET-O0562-v2, 15th Meeting: Gothenburg, SE, Jul. 3-12, 2019, 7 pages.

Bross et al. "High Efficiency Video Coding (HEVC) text specification draft 10 (for FDIS and Last Call)," Joint Collaborative Team on Video Coding (JCT-VC), JCTVC-L1003_v34, 12th Meeting: Geneva, CH, Jan. 14-23, 2013, 310 pages.

Bross et al., "Versatile Video Coding (Draft 5)," JVET-N1001-v10, 14th Meeting: Geneva, CH, Mar. 19-27, 2019, 406 pages.

Bross et al., "Versatile Video Coding (Draft 6)," JVET-O2001-vE, 15th Meeting: Gothenburg, SE, Jul. 3-12, 2019, 455 pages.

Chen et al., "Algorithm description for Versatile Vide Coding and Test Model 5 (VTM 5)," JVET-N1002-v2, 14th Meeting: Geneva, CH, 76 pages (2019).

Chen et al., "Algorithm Description of Joint Exploration Test Model 7 (JEM 7)," JVET-G1001-v1, 7th Meeting: Torino, IT, 13 pages (2017).

Ikonin et al., "AHG15: Signalling of chroma Qp mapping table," JVET-O0186-v2, 15th Meeting: Gothenburg, SE, Jul. 3-12, 2019, 12 pages.

Paluri et al., "AHG15: Chroma Quantization Qpc Parameter Signalling," JVET-O0298-r1, 15th Meeting: Gothenburg, SE, Jul. 3-12, 2019, 9 pages.

PCT International Search Report and Written Opinion dated Oct. 6, 2020, issued in corresponding International Application No. PCT/US2020/042739 (13 pgs.).

Pu et al., "AHG15: chroma quantization parameters Qpc table," JVET-O0433, 15th Meeting: Gothenburg, SE, Jul. 3-12, 2019, 6 pages.

Ramasubramonian et al., AHG15: On signaling of chroma QP tables, "JVET-O0650-v4," 15th Meeting: Gothenburg, SE, Jul. 3-12, 2019, 4 pages.

Strom et al., "High Quality HDR Video Compression using HEVC Main 10 Profile," Picture Coding Symposium (PCS), retrieved from http://www.jacobstrom.com/publications/Strom_et_al_PCS2016.pfd (2016).

Sullivan et al., "Overview of the High Efficiency Video Coding (HEVC) Standard," IEE Transactions on Circuits and Systems for Video Technology, vol. 22, No. 12, pp. 1649-1668 (2012).

* cited by examiner

Table 1 - Specification of QpC as a function of qPi for ChromaArrayType equal to 1

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| Qpc | = qPi | 29 | 30 | 31 | 32 | 33 | 33 | 34 | 34 | 35 | 35 | 36 | 36 | 37 | 37 | = qPi − 6 |

FIG. 5

Table 2 – The syntax structure of signaling the chroma QP tables

| sequence_parameter_set( ) { | Descriptor |
|---|---|
| ... | |
|   if( ChromaArrayType != 0 ) { | |
|     same_qp_table_for_chroma | u(1) |
|     for( i = 0; i < same_qp_table_for_chroma ? 1 : 3; i++ ) { | |
|       num_points_in_qp_table_minus1[ i ] | ue(v) |
|       for( j = 0; j <= num_points_in_qp_table_minus1[ i ]; j++ ) { | |
|         delta_qp_in_val_minus1[ i ][ j ] | ue(v) |
|         delta_qp_out_val[ i ][ j ] | ue(v) |
|       } | |
|     } | |
|   } | |
| ... | |
| } | |

FIG. 6

Table 3 — The derivation of the chroma QP tables in VVC draft 6

| Derivation process | Description |
|---|---|
| qpInVal[ i ][ 0 ] = −QpBdOffset$_C$ + delta_qp_in_val_minus1[ i ][ 0 ]<br>qpOutVal[ i ][ 0 ] = −QpBdOffset$_C$ + delta_qp_out_val[ i ][ 0 ] | Initial input and output coordinates |
| for ( j = 1; j <= num_points_in_qp_table_minus1[ i ]; j++ ) {<br>    qpInVal[ i ][ j ] = qpInVal[ i ][ j − 1 ] + delta_qp_in_val_minus1[ i ][ j ] + 1<br>    qpOutVal[ i ][ j ] = qpOutVal[ i ][ j − 1 ] + delta_qp_out_val[ i ][ j ]<br>} | Set the input and output coordinates of each piece |
| ChromaQpTable[ i ][ qpInVal[ i ][ 0 ] ] = qpOutVal[ i ][ 0 ] | Initialize the table at the beginning of the first intermediate piece |
| for ( k = qpInVal[ i ][ 0 ] − 1; k >= −QpBdOffset$_C$; k − − )<br>    ChromaQpTable[ i ][ k ] = Clip3( −QpBdOffset$_C$, 63, ChromaQpTable[ i ][ k + 1 ] − 1 ) | Derivation of the leftmost piece |
| for ( j = 0; j < num_points_in_qp_table_minus1[ i ]; j++ ) {<br>    sh = ( delta_qp_in_val_minus1[ i ][j + 1] + 2 ) >> 1<br>    for( k = qpInVal[ i ][ j ] + 1, m = 1; k <= qpInval[ i ][ j + 1 ]; k++, m++ )<br>        ChromaQpTable[ i ][ k ] = ChromaQpTable[ i ][ qpInVal[ i ][j] ] +<br>        ( delta_qp_out_val[ i ][j + 1] * m + sh ) / ( delta_qp_in_val_minus1[ i ][j + 1] + 1 )<br>} | Derivaion of each intermediate piece |
| for( k = qpInVal[ i ][ num_points_in_qp_table_minus1[ i ] ] + 1; k <= 63; k++ )<br>    ChromaQpTable[ i ][ k ] = Clip3( −QpBdOffset$_C$, 63, ChromaQpTable[ i ][ k − 1 ] + 1 ) | Derivation of the rightmost piece |

FIG. 8

Table 4 – The proposed syntax structure of signaling the chroma QP tables

| sequence_parameter_set() { | Descriptor |
|---|---|
| ... | |
|   if( ChromaArrayType != 0 ) { | |
|     *qp_table_for_chroma_present_flag* | u(1) |
|     if(qp_table_for_chroma_present_flag){ | |
|       *same_qp_table_for_cbcr* | u(1) |
|       if(sps_joint_cbcr_enabled_flag) | |
|         *qp_table_for_jointcbcr_present_flag* | u(1) |
|     } | |
|     *for( i = 0; i < 2 - same_qp_table_for_cbcr + qp_table_for_jointcbcr_present_flag; i++ ) {* | |
|       num_points_in_qp_table_minus1[ i ] | ue(v) |
|       for( j = 0; j <= num_points_in_qp_table_minus1[ i ]; j++ ) { | |
|         delta_qp_in_val_minus1[ i ][ j ] | ue(v) |
|         delta_qp_out_val[ i ][ j ] | ue(v) |
|       } | |
|     } | |
|   } | |
| ... | |
| } | |

FIG. 9

Table 5 – The proposed syntax structure of signaling the chroma QP tables

| sequence_parameter_set( ) { | Descriptor |
|---|---|
| ... | |
|   if( ChromaArrayType != 0 ) { | |
|     same_qp_table_for_chroma | u(1) |
|     for( i = 0; i < same_qp_table_for_chroma ? 1 : 3; i++ ) { | |
|       num_points_in_qp_table_minus1[ i ] | ue(v) |
|       for( j = 0; j <= num_points_in_qp_table_minus1[ i ]; j++ ) { | |
|         delta_qp_in_val_minus1[ i ][ j ] | ue(v) |
|         *qp_out_val_diffin[ i ][ j ]* | se(v) |
|       } | |
|     } | |
|   } | |
| ... | |
| } | |

FIG. 10

Table 6 – The derivation of the chroma QP tables

| Derivation process | Description |
|---|---|
| qpInVal[ i ][ 0 ] = −QpBdOffset$_C$ + delta_qp_in_val_minus1[ i ][ 0 ]<br>for ( j = 1; j <= num_points_in_qp_table_minus1[ i ]; j++ ) {<br>   qpInVal[ i ][ j ] = qpInVal[ i ][ j − 1 ] + delta_qp_in_val_minus1[ i ][ j ] + 1<br>} | Set the input coordinates of each piece s |
| for ( j = 0; j <= num_points_in_qp_table_minus1[ i ]; j++ ) {<br>   qpOutVal[ i ][ j ] = qpInVal[ i ][ j ] − qp_out_val_diffn[ i ][ j ]<br>} | Set the output coordinates of each piece |
| ChromaQpTable[ i ][ qpInVal[ i ][ 0 ] ] = qpOutVal[ i ][ 0 ] | Initialize the table |
| for ( k = qpInVal[ i ][ 0 ] − 1; k >= −QpBdOffset$_C$; k−− )<br>   ChromaQpTable[ i ][ k ] = Clip3( −QpBdOffset$_C$, 63,<br>   ChromaQpTable[ i ][ k + 1 ] − 1 ) | Derivation of the leftmost piece |
| for ( j = 0; j < num_points_in_qp_table_minus1[ i ]; j++ ) {<br>   sh = ( delta_qp_in_val_minus1[ i ][ j + 1 ] + 2 ) >> 1<br>   for( k = qpInVal[ i ][ j ] + 1, m = 1; k <= qpInval[ i ][ j + 1 ]; k++, m++ )<br>      ChromaQpTable[ i ][ k ] = ChromaQpTable[ i ][ qpInVal[ i ][ j ] ] +<br>      ( (qpOutVal[ i ][ j + 1 ] − qpOutVal[ i ][ j ]) * m + sh ) /<br>      ( delta_qp_in_val_minus1[ i ][ j + 1 ] + 1 )) | Derivaion of each intermediate piece |
| for( k = qpInVal[ i ][ num_points_in_qp_table_minus1[ i ] ] + 1; k <= 63; k++ )<br>   ChromaQpTable[ i ][ k ] = Clip3( −QpBdOffset$_C$, 63, ChromaQpTable[ i ][ k − 1 ] +<br>   1 ) | Derivation of the rightmost piece |

FIG. 11

Table 7 – Comparison between the current VVC and the proposed syntax structure when deriving the chroma QP tables

| index | 0 | 1 |
|---|---|---|
| delta_qp_in_val_minus1[ i ][ 2 ] | 43 | 11 |
| delta_qp_out_val[ i ][ 2 ] (VVC draft 6) | 44 | 9 |
| Number of bins (VVC draft 6) | 11 | 7 |
| qp_out_val_diffin[ i ][ 2 ] (proposed) | 0 | +3 |
| Number of bins (proposed) | 1 | 4 |

FIG. 12

Table 8 – The proposed syntax structure of signaling the chroma QP tables

| sequence_parameter_set( ) { | Descriptor |
|---|---|
| ... | |
|   if( ChromaArrayType != 0 ) { | |
|     same_qp_table_for_chroma | u(1) |
|     for( i = 0; i < same_qp_table_for_chroma ? 1 : 3; i++ ) { | |
|       num_points_in_qp_table_minus1[ i ] | ue(v) |
|       for( j = 0; j <= num_points_in_qp_table_minus1[ i ]; j++ ) { | |
|         delta_qp_in_val_minus1[ i ][ j ] | ue(v) |
|         *diff_delta_in_delta_out[ i ][ j ]* | se(v) |
|       } | |
|     } | |
|   } | |
| ... | |
| } | |

FIG. 13

Table 9 – The derivation of the chroma QP tables

| Derivation process | Description |
|---|---|
| qpInVal[ i ][ 0 ] = −QpBdOffset$_C$ + delta_qp_in_val_minus1[ i ][ 0 ]<br>qpOutVal[ i ][ 0 ] = −QpBdOffset$_C$ + delta_qp_in_val_minus1[ i ][ 0 ] + 1 −<br>  diff_delta_in_delta_out[ i ][ 0 ] | Initial input and output coordinate |
| for ( j = 1; j <= num_points_in_qp_table_minus1[ i ]; j++ ) {<br>  qpInVal[ i ][ j ] = qpInVal[ i ][ j − 1 ] + delta_qp_in_val_minus1[ i ][ j ] + 1<br>  qpOutVal[ i ][ j ] = qpOutVal[ i ][ j − 1 ] + delta_qp_in_val_minus1[ i ][ j ] + 1 −<br>  delta_qp_out_val_minus1n [ i ][ j ]<br>} | Set the output coordinates of each piece |
| ChromaQpTable[ i ][ qpInVal[ i ][ 0 ] ] = qpOutVal[ i ][ 0 ] | Initialize the table |
| for ( k = qpInVal[ i ][ 0 ] − 1; k >= −QpBdOffset$_C$; k−− )<br>  ChromaQpTable[ i ][ k ] = Clip3( −QpBdOffset$_C$, 63,<br>  ChromaQpTable[ i ][ k + 1 ] − 1 ) | Derivation of the leftmost piece |
| for ( j = 0; j < num_points_in_qp_table_minus1[ i ]; j++ ) {<br>  sh = ( delta_qp_in_val_minus1[ i ][ j + 1 ] + 2 ) >> 1<br>  for( k = qpInVal[ i ][ j ] + 1, m = 1; k <= qpInVal[ i ][ j + 1 ]; k++, m++ )<br>    ChromaQpTable[ i ][ k ] = ChromaQpTable[ i ][ qpInVal[ i ][ j ] ] + (<br>    (delta_qp_in_val_minus1[ i ][ j + 1 ] +1 − diff_delta_in_delta_out[ i ][ j + 1]) *<br>    m + sh ) / ( delta_qp_in_val_minus1[ i ][ j + 1 ] + 1) | Derivation of each intermediate piece |
| for( k = qpInVal[ i ][ num_points_in_qp_table_minus1[ i ] ] + 1; k <= 63; k++ )<br>  ChromaQpTable[ i ][ k ] = Clip3( −QpBdOffset$_C$, 63, ChromaQpTable[ i ][ k − 1 ] +<br>  1 ) | Derivation of the rightmost piece |

FIG. 14

Table 10 – Comparison between the current VVC and the proposed syntax structure when deriving the chroma QP tables

| index | 0 | 1 |
|---|---|---|
| delta_qp_in_val_minus1[ i ][ 2 ] | 43 | 11 |
| delta_qp_out_val[ i ][ 2 ] (VVC draft 6) | 44 | 9 |
| Number of bins (VVC draft 6) | 11 | 7 |
| diff_delta_in_delta_out [ i ][ 2 ] (proposed) | 0 | +3 |
| Number of bins (proposed) | 1 | 4 |

FIG. 15

Table 11 – The proposed syntax structure of signaling the chroma QP tables

| sequence_parameter_set( ) { | Descriptor |
|---|---|
| ... | |
|   if( ChromaArrayType != 0 ) { | |
|     same_qp_table_for_chroma | u(1) |
|     for( i = 0; i < same_qp_table_for_chroma ? 1 : 3; i++ ) { | |
|       num_points_in_qp_table_minus1[ i ] | ue(v) |
|       *out_val_cross_sign_flag[ i ]* | u(1) |
|       *if( !cross_sign_flag[ i ] )* | |
|         *out_val_sign_flag[ i ]* | u(1) |
|       for( j = 0; j <= num_points_in_qp_table_minus1[ i ]; j++ ) { | |
|         delta_qp_in_val_minus1[ i ][ j ] | ue(v) |
|         *if(cross_sign_flag[ i ])* | |
|           *qp_out_val_diff[ i ][ j ]* | se(v) |
|         *else{* | |
|           *qp_out_val_diff[ i ][ j ]* | ue(v) |
|       } | |
|     } | |
|   } | |
| ... | |
| } | |

FIG. 16

Table 12 – Comparison between the current VVC and the proposed syntax structure with sign constraint element when deriving the chroma QP tables

| index | 0 | 1 | out_val_cross_sign_flag[ 0 ] | out_val_sign_flag[ 0 ] |
|---|---|---|---|---|
| delta_qp_in_val_minus1[ i ][ 2 ] | 43 | 11 | – | – |
| delta_qp_out_val[ i ][ 2 ] (VVC draft 6) | 44 | 9 | – | – |
| Number of bins (VVC draft 6) | 11 | 7 | – | – |
| qp_out_val_diffin[ i ][ 2 ] (proposed) | 0 | 3 | 0 | 0 |
| Number of bins (proposed) | 1 | 3 | 1 | 1 |

FIG. 17

Table 13 – The proposed syntax structure of signaling the chroma QP tables

| sequence_parameter_set( ) { | Descriptor |
|---|---|
| ... | |
|   if( ChromaArrayType != 0 ) { | |
|     same_qp_table_for_chroma | u(1) |
|     for( i = 0; i < same_qp_table_for_chroma ? 1 : 3; i++ ) { | |
|       num_points_in_qp_table_minus1[ i ] | ue(v) |
|       *delta_qp_out_val [ i ][ 0 ]* | ue(v) |
|       *for( j = 1; j <= num_points_in_qp_table_minus1[ i ] + 1; j++ ) {* | |
|         delta_qp_in_val_minus1[ i ][ j ] | ue(v) |
|         delta_qp_out_val [ i ][ j ] | ue(v) |
|       } | |
|       *delta_qp_out_val [ i ][ num_points_in_qp_table_minus1[ i ]+2]* | ue(v) |
|     } | |
|   } | |
| ... | |
| } | |

FIG. 19

Table 14 – The new derivation process of the chroma QP table

| Derivation process | Description |
|---|---|
| qpInVal[ i ][ 0 ] = −QpBdOffset$_C$<br>qpOutVal[ i ][ 0 ] = −QpBdOffset$_C$ + delta_qp_out_val[ i ][ 0 ]<br>*for ( j = 1; j <= num_points_in_qp_table_minus1[ i ] + 1; j++ ) {*<br>    qpInVal[ i ][ j ] = qpInVal[ i ][ j − 1 ] + delta_qp_in_val_minus1[ i ][ j ] + 1<br>    qpOutVal[ i ][ j ] = qpOutVal[ i ][ j − 1 ] + delta_qp_out_val[ i ][ j ]<br>}<br>*delta_qp_in_val_minus1[ i ][ num_points_in_qp_table_minus1[ i ]+2 ] = 62 −*<br>*qpInVal[ i ][ num_points_in_qp_table_minus1[ i ]+1 ]*<br>*qpInVal[ i ][ num_points_in_qp_table_minus1[ i ]+2 ] = 63*<br>*qpOutVal[ i ][ num_points_in_qp_table_minus1[ i ]+2 ] =*<br>*qpOutVal[ i ][ num_points_in_qp_table_minus1[ i ]+1 ] +*<br>*delta_qp_out_val[ i ][ num_points_in_qp_table_minus1[ i ] + 2 ]* | set the input and output coordinates of each piece |
| ChromaQpTable[ i ][ qpInVal[ i ][ 0 ] ] = qpOutVal[ i ][ 0 ] | Initialize the table |
| *for ( j = 0; j < num_points_in_qp_table_minus1[ i ]+2; j++ ) {*<br>    sh = ( delta_qp_in_val_minus1[ i ][ j + 1 ] + 2 ) >> 1<br>    for( k = qpInVal[ i ][ j ] + 1, m = 1; k <= qpInval[ i ][ j + 1 ]; k++, m++ )<br>        ChromaQpTable[ i ][ k ] = ChromaQpTable[ i ][ qpInVal[ i ][ j ] ] +<br>        ( delta_qp_out_val[ i ][ j + 1 ] * m + sh ) /<br>( delta_qp_in_val_minus1[ i ][ j + 1 ] + 1 )<br>} | derivation of each piece |

FIG. 20

Table 15 – The default values when qp_table_for_chroma_present_flag equals to 0

| index | 0 | 1 |
|---|---|---|
| delta_qp_in_val_minus1[ 0 ][ 2 ] | 43 | 11 |
| delta_qp_out_val[ 0 ][ 2 ] | 44 | 9 |

FIG. 21

Table 16 – The default values when qp_table_for_chroma_present_flag equals to 0

| index | 0 | 1 |
|---|---|---|
| delta_qp_in_val_minus1[ 0 ][ 2 ] | 43 | 11 |
| qp_out_val_diffin[ 0 ][ 2 ] | 0 | -3 |
| diff_delta_in_delta_out [ 0 ][ 2 ] | 0 | -3 |

FIG. 22

Table 17 – The default values when qp_table_for_chroma_present_flag equals to 0

| index | 0 | 1 | 2 | 3 |
|---|---|---|---|---|
| delta_qp_in_val_minus1[0][2] | null | 43 | 11 | null |
| delta_qp_out_val [0][4] | 0 | 44 | 9 | 19 |

FIG. 23

Table 18 – The proposed syntax structure of signaling the control points

| sequence_parameter_set( ) { | Descriptor |
|---|---|
| ... | |
|   if( ChromaArrayType != 0 ) { | |
|     same_qp_table_for_chroma | u(1) |
|     for( i = 0; i < same_qp_table_for_chroma ? 1 : 3; i++ ) { | |
|       *num_points_in_qp_table[ i ]* | ue(v) |
|       *if( num_points_in_qp_table[ i ] > 0 ){* | |
|         for( j = 0; j < num_points_in_qp_table[ i ]; j++ ) { | |
|           delta_qp_in_val_minus1[ i ][ j ] | ue(v) |
|           delta_qp_out_val[ i ][ j ] | ue(v) |
|         } | |
|       } | |
|     } | |
|   } | |
| ... | |
| } | |

FIG. 24

METHOD AND SYSTEM FOR SIGNALING CHROMA QUANTIZATION PARAMETER TABLE

CROSS-REFERENCE TO RELATED APPLICATIONS

The present disclosure claims priority to U.S. provisional application No. 62/894,673, filed on Aug. 30, 2019, which is incorporated herein by reference in its entirety.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

The embodiments of the present disclosure provide methods for signaling chroma quantization (QP) parameter table in video data processing. According to some exemplary embodiments, a video decoding method includes: receiving a bitstream of video data; determining whether a luma-to-chroma QP mapping table is signaled, based on a first flag in the bitstream; and in response to the first flag being a first value, determining the signaled luma-to-chroma QP mapping table based on the bitstream.

According to some other embodiments, a system for video decoding includes a memory configured to store instructions and one or more processors coupled to the memory. The one or more processors can be configured to execute the instructions to cause the system to: receive a bitstream of video data, determine whether a luma-to-chroma QP mapping table is signaled, based on a first flag in the bitstream, and in response to the first flag being a first value, determine the signaled luma-to-chroma QP mapping table based on the bitstream.

According to some other embodiments, a non-transitory computer-readable storage medium stores a set of instructions that are executable by one or more processors. The execution of the set of the instructions causes a device to perform: receiving a bitstream of video data; determining whether a luma-to-chroma QP mapping table is signaled, based on a first flag in the bitstream; and in response to the first flag being a first value, determining the signaled luma-to-chroma QP mapping table based on the bitstream.

BRIEF DESCRIPTION OF THE DRAWINGS

Embodiments and various aspects of the present disclosure are illustrated in the following detailed description and the accompanying figures. Various features shown in the figures are not drawn to scale.

FIG. 5 illustrates an exemplary Table 1 showing specification of QpC as a function of qPi for ChromaArrayType equal to 1 in VVC draft.

FIG. 6 illustrates an exemplary Table 2 showing syntax structure of signaling the chroma quantization parameter (QP) tables in VVC draft.

FIG. 8 illustrates an exemplary Table 3 showing derivation of the chroma QP tables in VVC draft.

FIG. 9 illustrates an exemplary Table 4, according to some embodiments of the present disclosure.

FIG. 10 illustrates an exemplary Table 5, according to some embodiments of the present disclosure.

FIG. 11 illustrates an exemplary Table 6, according to some embodiments of the present disclosure.

FIG. 12 illustrates an exemplary Table 7, according to some embodiments of the present disclosure.

FIG. 13 illustrates an exemplary Table 8, according to some embodiments of the present disclosure.

FIG. 14 illustrates an exemplary Table 9, according to some embodiments of the present disclosure.

FIG. 15 illustrates an exemplary Table 10, according to some embodiments of the present disclosure.

FIG. 16 illustrates an exemplary Table 11, according to some embodiments of the present disclosure.

FIG. 17 illustrates an exemplary Table 12, according to some embodiments of the present disclosure.

FIG. 19 illustrates an exemplary Table 13, according to some embodiments of the present disclosure.

FIG. 20 illustrates an exemplary Table 14, according to some embodiments of the present disclosure.

FIG. 21 illustrates an exemplary Table 15, according to some embodiments of the present disclosure.

FIG. 22 illustrates an exemplary Table 16, according to some embodiments of the present disclosure.

FIG. 23 illustrates an exemplary Table 17, according to some embodiments of the present disclosure.

FIG. 24 illustrates an exemplary Table 18, according to some embodiments of the present disclosure.

DETAILED DESCRIPTION

Figure 1:
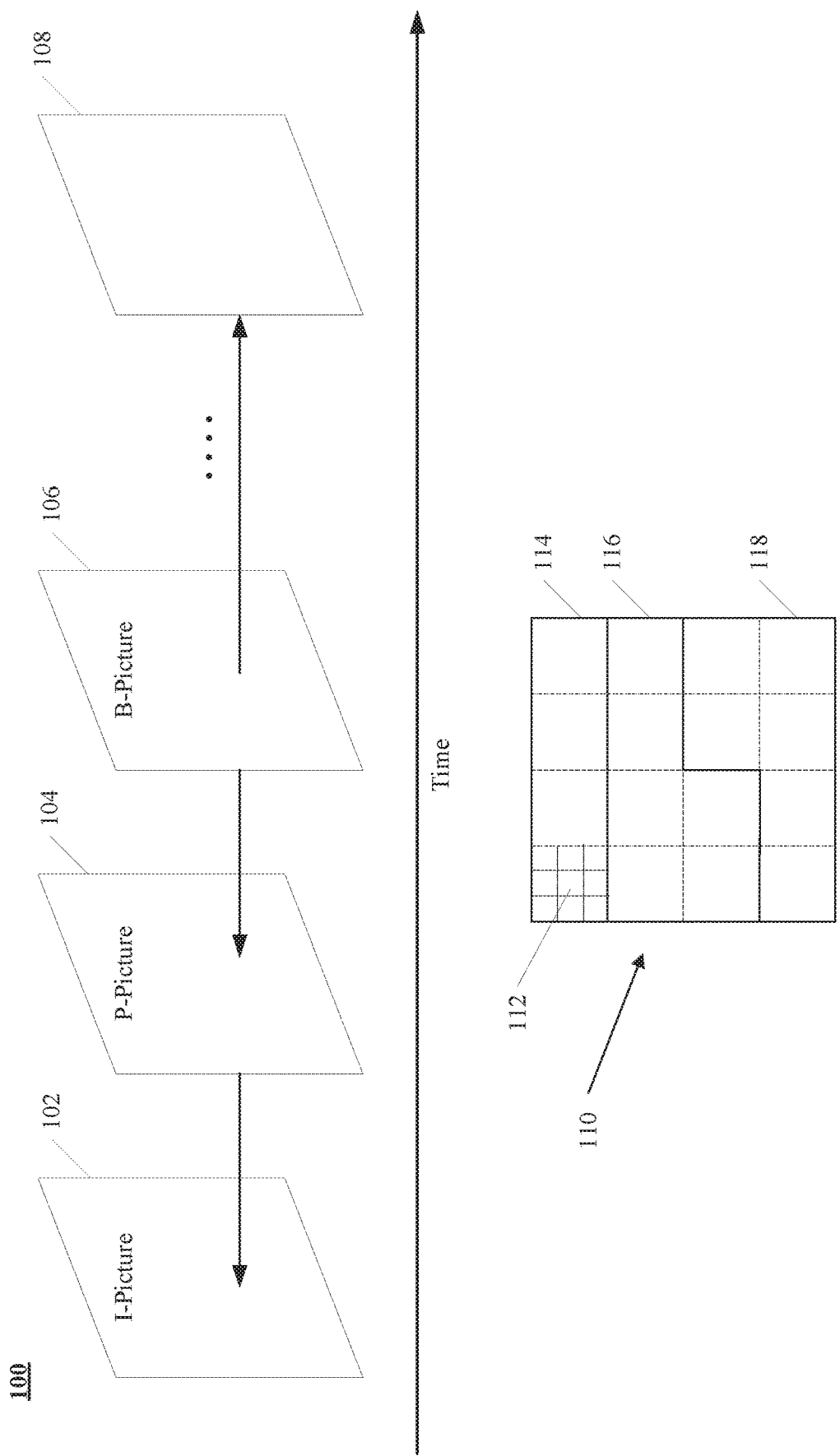
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266NVC). Any operation performed to a basic processing unit can be repeatedly performed to each of its luma and chroma components.

Figure 2:
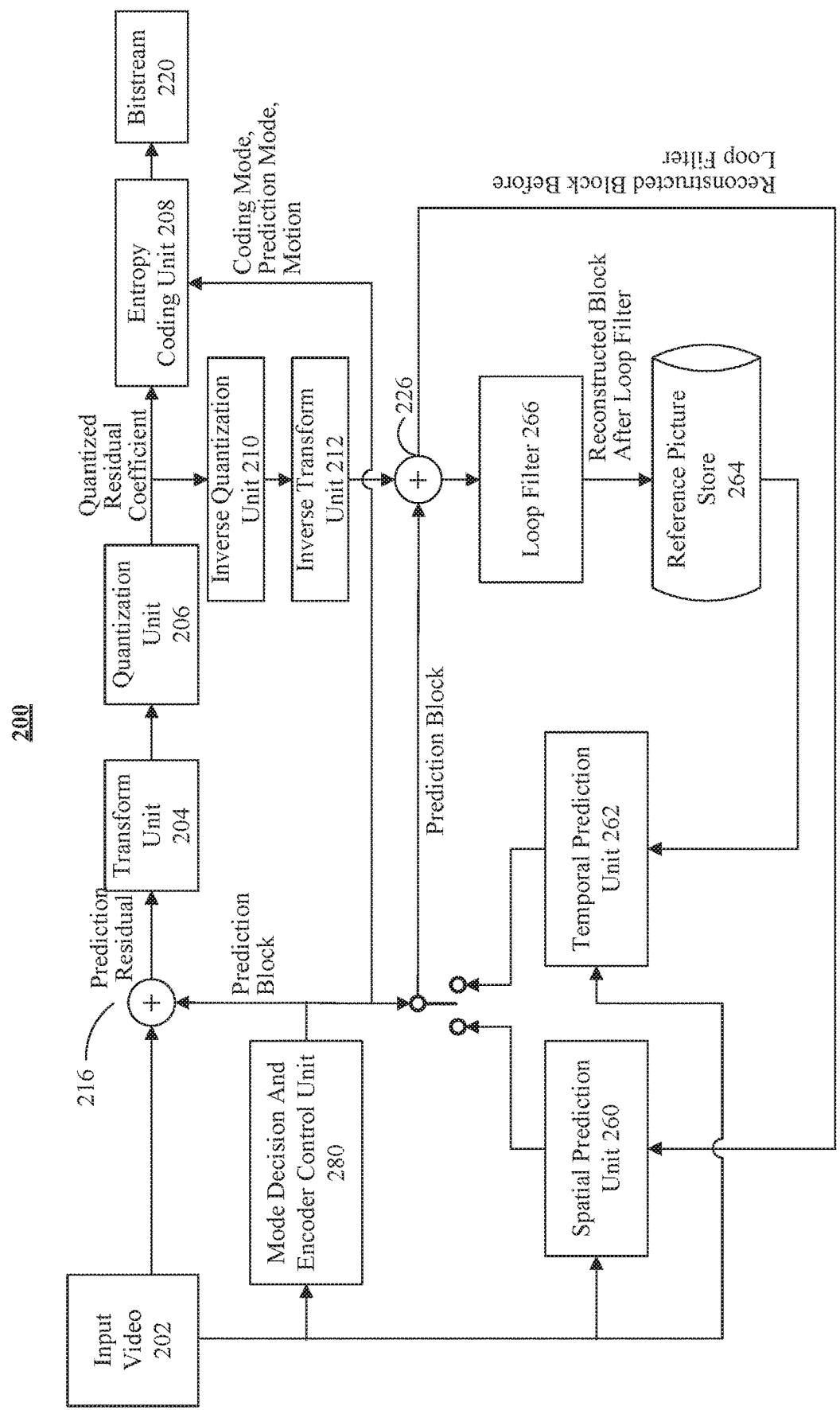
FIG. 2 illustrates a schematic diagram of an exemplary encoder in a hybrid video coding system, according to some embodiments of the present disclosure.
Figure 3:
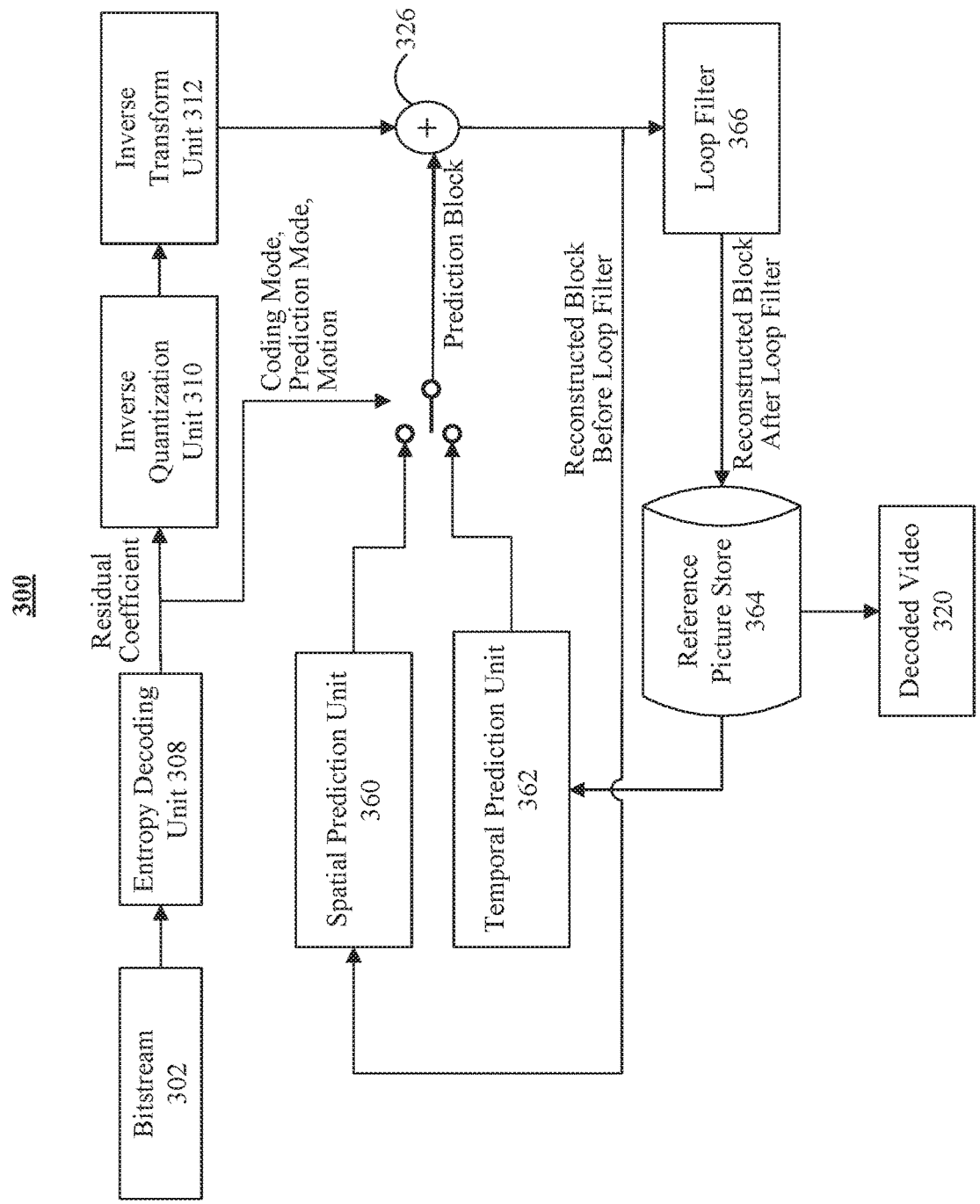
FIG. 3 illustrates a schematic diagram of an exemplary decoder in a hybrid video coding system, according to some embodiments of the present disclosure.

Video coding has multiple stages of operations, examples of which are shown in FIG. 2 and FIG. 3. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which is shown in FIG. 2), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIG. 2), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266NVC), at the level of which the prediction operation can be performed.

For another example, at a transform stage (an example of which is shown in FIG. 2), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266NVC, the prediction blocks and transform blocks of the same CU can have different sizes and numbers.

In structure 110 of FIG. 1, basic processing unit 112 is further divided into 3-3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2 illustrates a schematic diagram of an exemplary encoder 200 in a hybrid video coding system, according to some embodiments of the present disclosure. Video encoder 200 may perform intra- or inter-coding of blocks within video frames, including video blocks, or partitions or sub-partitions of video blocks. Intra-coding may rely on spatial prediction to reduce or remove spatial redundancy in video within a given video frame. Inter-coding may rely on temporal prediction to reduce or remove temporal redundancy in video within adjacent frames of a video sequence. Intra modes may refer to a number of spatial based compression modes. Inter modes (such as uni-prediction or bi-prediction) may refer to a number of temporal-based compression modes.

Referring to FIG. 2, input video signal 202 may be processed block by block. For example, the video block unit may be a 16.16 pixel block (e.g., a macroblock (MB)). The size of the video block units may vary, depending on the coding techniques used, and the required accuracy and efficiency. In HEVC, extended block sizes (e.g., a coding tree unit (CTU)) may be used to compress video signals of resolution, e.g., 1080p and beyond. In HEVC, a CTU may include up to 64.64 luma samples corresponding chroma samples, and associated syntax elements. In VVC, the size of a CTU may be further increased to include 128×128 luma samples, corresponding chroma samples, and associated syntax elements. A CTU can be further divided into coding units (CUs) using, for example, quad-tree, binary tree, or ternary tree. A CU may be further partitioned into prediction units (PUs), for which separate prediction methods may be applied. Each input video block may be processed by using spatial prediction unit 260 or temporal prediction unit 262.

Spatial prediction unit 260 performs spatial prediction (e.g., intra prediction) to the current block/CU using information on the same picture/slice containing the current block. Spatial prediction may use pixels from the already coded neighboring blocks in the same video picture frame/slice to predict the current video block. Spatial prediction may reduce spatial redundancy inherent in the video signal.

Temporal prediction unit 262 performs temporal prediction (e.g., inter prediction) to the current block using information from picture(s)/slice(s) different from the picture/slice containing the current block. Temporal prediction for a video block may be signaled by one or more motion vectors. In unit-directional temporal prediction, only one motion vector indicating one reference picture is used to generate the prediction signal for the current block. On the other hand, in bi-directional temporal prediction, two motion vectors, each indicating a respective reference picture, can be used to generate the prediction signal for the current block. The motion vectors may indicate the amount and the direction of motion between the current block and one or more associated block(s) in the reference frames. If multiple reference pictures are supported, one or more reference picture indices may be sent for a video block. The one or more reference indices may be used to identify from which reference picture(s) in the reference picture store or decoded picture buffer (DPB) 264, the temporal prediction signal may come.

Mode decision and encoder control unit 280 in the encoder may choose the prediction mode, for example, based on rate-distortion optimization. Based on the determined prediction mode, the prediction block can be obtained. The prediction block may be subtracted from the current video block at adder 216. The prediction residual may be transformed by transformation unit 204 and quantized by quantization unit 206. The quantized residual coefficients may be inverse quantized at inverse quantization unit 210 and inverse transformed at inverse transform unit 212 to form the reconstructed residual. The reconstructed residual may be added to the prediction block at adder 226 to form the reconstructed video block. The reconstructed video block before loop-filtering may be used to provide reference samples for intra prediction.

The reconstructed video block may go through loop filtering at loop filter 266. For example, loop filtering such as deblocking filter, sample adaptive offset (SAO), and adaptive loop filter (ALF) may be applied. The reconstructed block after loop filtering may be stored in reference picture store 264 and can be used to provide inter prediction reference samples for coding other video blocks. To form the output video bitstream 220, coding mode (e.g., inter or intra), prediction mode information, motion information, and quantized residual coefficients may be sent to the entropy coding unit 208 to further reduce the bit rate, before the data are compressed and packed to form bitstream 220.

FIG. 3 illustrates a schematic diagram of an exemplary decoder 300 in a hybrid video coding system, according to some embodiments of the present disclosure. Referring to FIG. 3, a video bitstream 302 may be unpacked or entropy decoded at entropy decoding unit 308. The coding mode information can be used to determine whether the spatial prediction unit 360 or the temporal prediction unit 362 is to be selected. The prediction mode information can be sent to the corresponding prediction unit to generate the prediction block. For example, motion compensated prediction may be applied by the temporal prediction unit 362 to form the temporal prediction block.

The residual coefficients may be sent to inverse quantization unit 310 and inverse transform unit 312 to obtain the reconstructed residual. The prediction block and the reconstructed residual can be added together at 326 to form the reconstructed block before loop filtering. The reconstructed block may then go through loop filtering at loop filer 366. For example, loop filtering such as deblocking filter, SAO, and ALF may be applied. The reconstructed block after loop filtering can then be stored in reference picture store 364. The reconstructed data in the reference picture store 364 may be used to obtain decoded video 320, or used to predict future video blocks. Decoded video 320 may be displayed on a display device, such as a TV, a PC, a smartphone, or a tablet to be viewed by the end-users.

Figure 4:
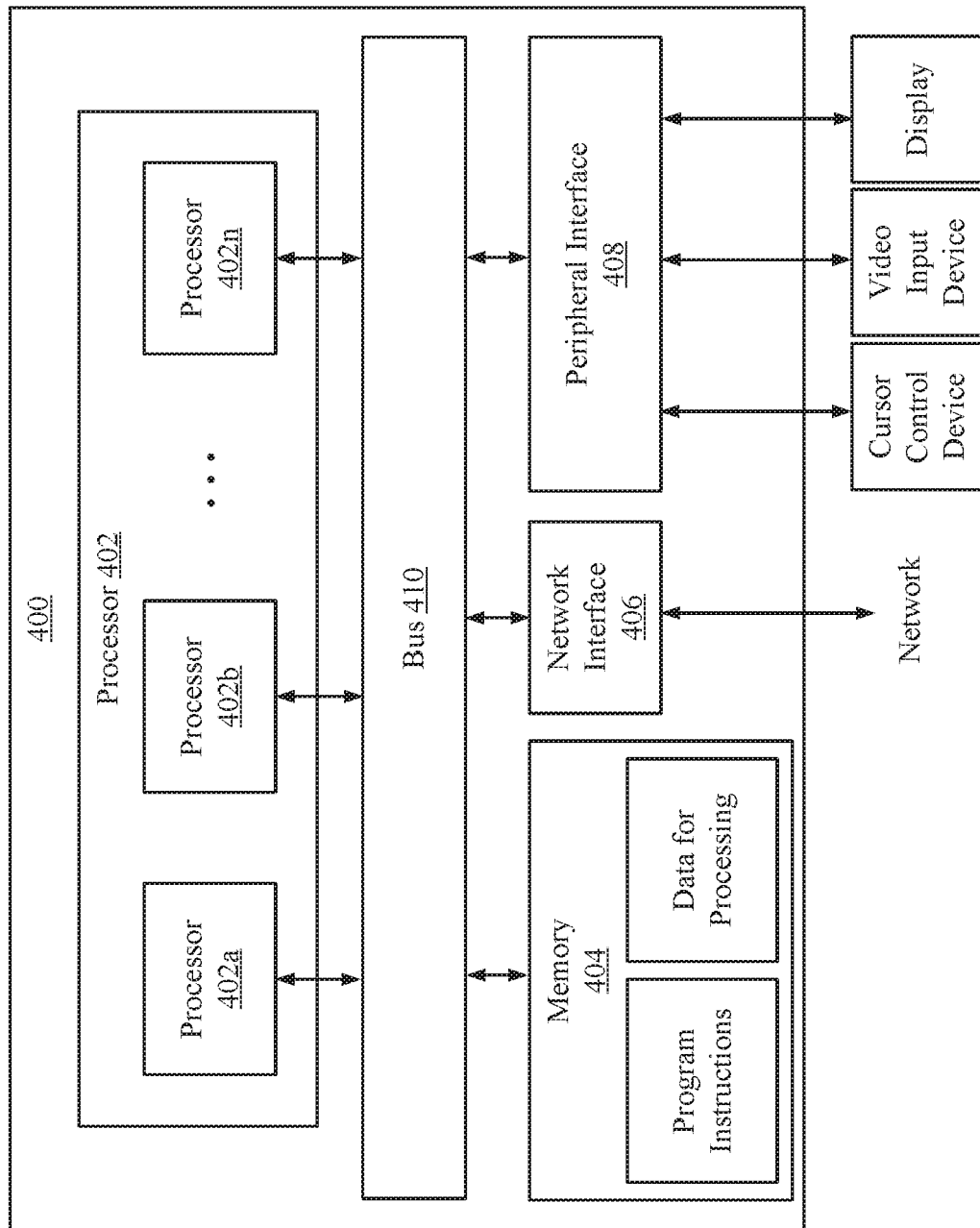
FIG. 4 illustrates a block diagram of an exemplary apparatus for encoding or decoding a video, according to some embodiments of the present disclosure.

FIG. 4 is a block diagram of an exemplary apparatus 400 for encoding or decoding a video, according to some embodiments of the present disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in FIG. 2 or FIG. 3) and data for processing. Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in the present disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs can be implemented as any combination of any software or hardware modules in apparatus 400. For example, some or all stages of encoder 200 of FIG. 2 or decoder 300 of FIG. 3 can be implemented as one or more software modules of apparatus 400, such as program instructions that can be loaded into memory 404. For another example, some or all stages of encoder 200 of FIG. 2 or decoder 300 of FIG. 3 can be implemented as one or more hardware modules of apparatus 400, such as a specialized data processing circuit (e.g., an FPGA, an ASIC, an NPU, or the like).

In the quantization and inverse quantization functional blocks (e.g., quantization unit 206 and inverse quantization unit 210 of FIG. 2, inverse quantization unit 310 of FIG. 3), a quantization parameter (QP) is used to determine the amount of quantization (and inverse quantization) applied to the prediction residuals. Initial QP values used for coding of a picture or slice may be signaled at the high level, for example, using init_qp_minus26 syntax element in the Picture Parameter Set (PPS) and using slice_qp_delta syntax element in the slice header. Further, the QP values may be adapted at the local level for each CU using delta QP values sent at the granularity of quantization groups.

The luma component and the chroma components may use different QP values. The chroma QP values are adjusted based on the luma QP value at the corresponding level. At the picture or slice level, high level syntax elements in the Picture Parameter Set (PPS) and the slice header are signaled to indicate how to adjust the luma QP value to derive the chroma QP values. For example, syntax elements pps_cb_qp_offset and slice_cb_qp_offset are sent for the Cb component and syntax elements pps_cr_qp_offset and slice_cr_qp_offset are sent for the Cr component. Further, VVC supports a coding tool called the joint CbCr residual coding, where the Cb and Cr prediction residuals are coded together only once. For transform units coded using this joint CbCr coding mode, the corresponding luma-to-chroma delta QP values are signaled using the PPS and slice-header level syntax elements pps_joint_cbcr_qp_offset and slice_joint_cbcr_qp_offset, respectively. Chroma delta QPs may also be signaled at the local (e.g., CU or quantization group) level. For example, CuQpOffsetCb, CuQpOffsetCr and $CuQpOffset_{CbCr}$ can be signaled for the Cb, Cr components and joint CbCr coded blocks respectively to represent the chroma QP adjustment at the CU or TU level.

Further, FIG. 5 illustrates an exemplary Table 1 showing specification of QpC as a function of qPi for ChromaArrayType equal to 1 in VVC draft. A luma-to-chroma mapping may be applied using Table 1, where the qPi denotes the input luma QP for a block and Qpc denotes the corresponding chroma QP for that same block. The same mapping table has been used in the H.264 and HEVC standards, as well as in VVC until VVC draft 5. The motivation for this mapping relationship is to let the chroma QP values increase more slowly than the luma QP values for medium to high quantization level. This has previously been shown to reduce chroma artifacts when medium to high quantization level is applied. After this mapping is performed, the chroma QPs for the block are further adjusted according to the PPS, slice-header and CU/TU level syntax elements.

Instead of using a fixed luma-to-chroma QP mapping table as in Table 1, a number of contributions proposed more flexible signaling mechanisms for the luma-to-chroma QP mapping table at the July 2019 JVET meeting. The method in that signals the luma-to-chroma QP mapping tables using piece-wise linear functions was adopted in VVC draft 6. For the rest of this disclosure, the luma-to-chroma QP mapping table is also referred to as chroma QP table. FIG. 6 illustrates an exemplary Table 2 showing syntax structure of signaling the chroma quantization parameter (QP) tables in VVC draft. In VVC draft 6, the signaling mechanism shown in Table 2 is used to derive the chroma QP tables.

When ChromaArrayType is not 0, the syntax element same_qp_table_for_chroma is coded to signal the number of chroma QP table. If syntax element same_qp_table_for_chroma is equal to 1, only one chroma QP mapping table is signaled and this table applies to Cb and Cr residuals as well as joint CbCr residuals. Otherwise if syntax element same_qp_table_for_chroma is equal to 0, three chroma QP mapping tables are signaled for Cb, Cr and joint CbCr separately.

Figure 7:
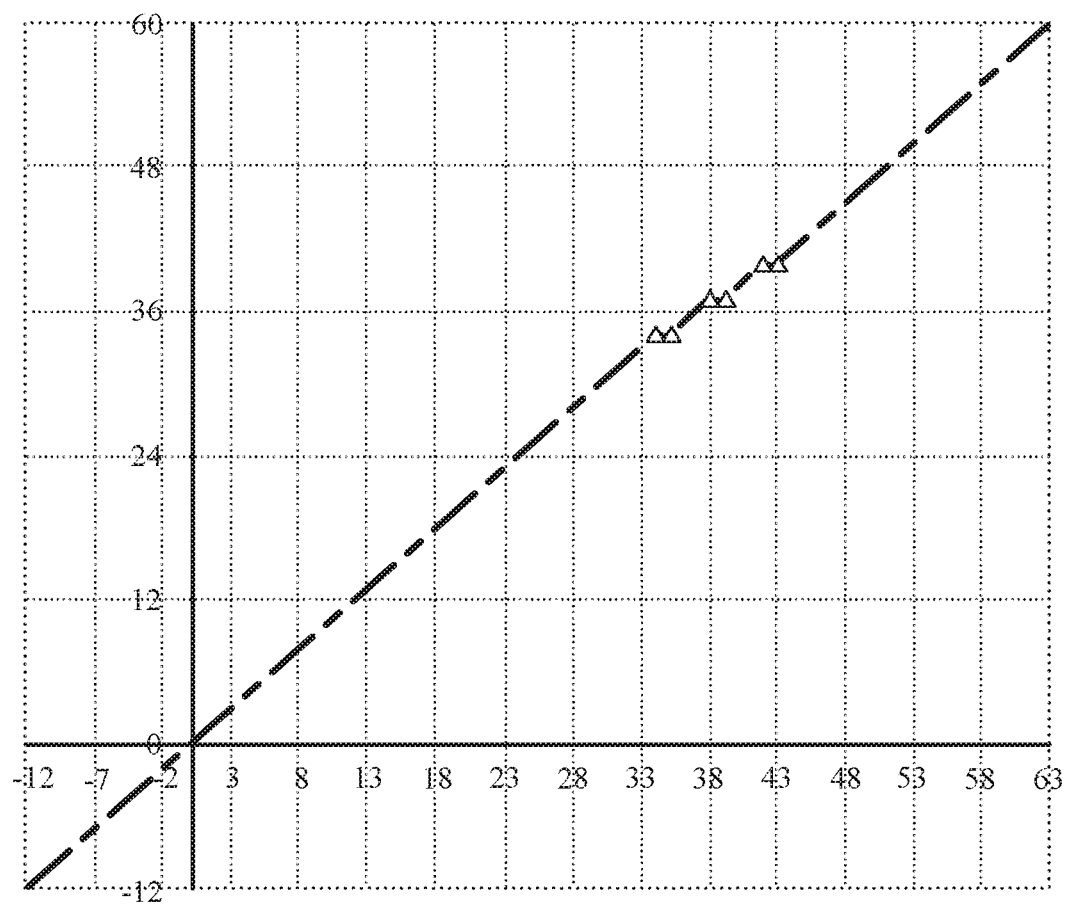
FIG. 7 illustrates an exemplary chroma QP mapping relationship, according to some embodiments of the present disclosure.

Next, derivation of the chroma QP table is described. For the chroma QP table (of any of Cb, Cr, or joint CbCr), the mapping relationship 500 is a piece-wise linear function, for example, as illustrated in FIG. 7. To signal the mapping function, three syntax elements for each of the piece in the piece-wise linear function are coded, including syntax elements num_points_in_qp_table_minus1[i], delta_qp_in_val_minus1[i][j] and delta_qp_out_val[i][j], where i is the index of the chroma QP table (indicating if it's for Cb, Cr, or joint CbCr), and j is the number of the specified piece in the mapping function. Syntax element num_points_in_qp_table_minus plus 1 can specify the total number of points used to describe the chroma QP mapping table. Each piece in the mapping function can be represented by its corresponding control point and its previous control point (these "control points" are marked using triangle in FIG. 7), and hence syntax element num_points_in_qp_table_minus1[i] plus 1 can specify the number of pieces in the i-th chroma QP table. Without loss of generality, the j-th piece of the i-th chroma mapping table can be defined by the corresponding syntax elements delta_qp_in_val_minus1[i][j] and delta_qp_out_val[i][j], where delta_qp_in_val_minus1[i][j]+1 denotes the delta value of the input coordinates of this piece and syntax element delta_qp_out_val[i][j] denotes the delta value of the output coordinates of this piece.

FIG. 8 illustrates an exemplary Table 3 showing derivation of the chroma QP tables in VVC draft. Table 3 shows the process to derive the i-th chroma QP mapping table ChromaQpTable[i] for i=0. Syntax element same_qp_table_for_chroma ? 0:2. In Table 3, the chroma QP is clipped between the range [-QpBdOffsetc, 63]. Here, QpBdOffsetc can specify the value of the chroma quantization parameter range offset. QpBdOffsetc is determined by the bit depth of the chroma samples BitDepthc as follows:

$$QpBdOffsetC=6*(BitDepthC-8) \quad (1)$$

For the example showed in FIG. 7, this mapping function can be represented by the control points (32, 32) and (44, 41). For the i-th chroma QP table, the delta_qp_in_val_minus1[i][2]=(43, 11) and delta_qp_out_val[i][2]=(44, 9).

The above signaling method of chroma QP tables supports one table applied to all the Cb, Cr and joint CbCr residuals or three tables applied to Cb, Cr and joint CbCr separately. For each mapping table, the mapping function is a piece-wise linear function where each piece is defined by the delta output and delta input values. However, this signaling mechanism may have the following drawbacks.

First, when ChromaArrayType is not 0, at least one chroma QP table is signaled in the Sequence Parameter Set (SPS) because no default chroma QP table is specified in VVC draft 6.

Second, the number of chroma QP table is 1 or 3, and the case of signaling 2 tables is not considered. Signaling two tables may be a common case, where the first table is applied to both Cb and Cr residuals, and the second table is applied to the joint CbCr residuals.

Third, the signaling of the chroma QP table for the joint CbCr residuals does not consider if joint CbCr residual coding tool is enabled or not, which could result in wasting the bits needed to signal that chroma QP table even when the joint residual coding tool is not used at all. For example, when syntax element same_qp_table_for_chroma equals 0, three chroma QP tables for Cb, Cr and joint CbCr are signaled separately without considering whether joint CbCr tool is enabled or not.

Fourth, with respect to the derivation of the chroma QP table, the mapping function is specified by the arrays of delta input values of each piece and delta output values of each piece. This mechanism may consume more bits in some cases.

Fifth, the control points only define the mapping relationship of the intermediate pieces of the mapping function. However, as for the leftmost and rightmost pieces, the mapping slopes are fixed to 1.

Sixth, considering the syntax element num_points_in_qp_table_minus1 is 0 or positive, the number of control points is larger than 0 and hence at least one control point is coded. However, if the mapping relationship contains just one piece, the number of control points should be 0.

The following disclosed embodiments provide solutions to address the above issues.

FIG. 9 illustrates an exemplary Table 4, according to some embodiments of the present disclosure. Table 4 shows a syntax structure to address the first to third problems (emphases shown in italics).

In Table 4, there are three added syntax elements:
"qp_table_for_chroma_present_flag,"
"same_qp_table_for_cbcr," and
"qp_table_for_jointcbcr_present_flag."

For example, syntax element qp_table_for_chroma_present_flag equal to 1 can specify that at least one chroma QP table is signaled in the SPS, while syntax element qp_table_for_chroma_present_flag equal to 0 can specify that the chroma QP tables are not present in the SPS. When not present, the chroma QP tables for the Cb and Cr residuals can be derived by the default process described below.

For example, syntax element same_qp_table_for_cbcr equal to 1 can specify that only one chroma QP mapping table is signaled and this table applies to both Cb and Cr residuals, while syntax element same_qp_table_for_cbcr equal to 0 can specify that two chroma QP mapping tables are signaled in the SPS for the Cb and Cr residuals separately.

Syntax element qp_table_for_jointcbcr_present_flag equal to 1 can specify that the chroma QP table for the joint CbCr residuals is signaled in SPS. Syntax element qp_table_forjointcbcr_present_flag equal to 0 can specify that the chroma QP mapping table applied to joint CbCr residuals is not present in the SPS. When chroma QP table for joint CbCr residuals is not present in the SPS, the ChromaQpTable for the joint CbCr can be derived by averaging the chroma QP tables for the Cb and Cr residuals. When not present, syntax element qp_table_forjointcbcr_present_flag is set to 0.

By this way, the chroma QP tables for Cb, Cr, and joint CbCr residuals can be signaled with more flexibility, and signaled only when necessary. The number of signaled tables is computed by 2−same_qp_table_for_cbcr+qp_table_for_jointcbcr_present_flag. Note that when syntax element sps_joint_cbcr_enabled_flag is set to 0 (i.e. joint CbCr residual coding is not enabled), or when syntax element qp_table_for_chroma_present_flag is set to 0 (i.e., no chroma QP table is not signaled in the SPS), syntax element qp_table_for_jointcbcr_present_flag is set to 0, which means no chroma QP table needs to be signaled for joint CbCr residuals.

In VVC draft 6, the derivation of chroma QP table is based on the coded control points defining the piece-wise linear mapping relationship. The control points are specified by the syntax elements delta_qp_in_val_minus1 and delta_qp_out_val, which represent the delta input values of two consecutive control points and the delta output values of two consecutive control points. Several other methods to signal the control points are described below.

In some embodiments, the differences between input values and output values of control points are signaled. Specifically, the mapping function is still defined by the control points. Syntax element num_points_in_qp_table_minus1 plus 1 can specify the number of control points, and the piece of mapping function between two control points are specified by the delta values of input and output. However, the output values, instead of transmitting the delta values between two consecutive output control points using syntax element delta_qp_out_val[i][j], are signaled as syntax element qp_out_val_diff_in[i][j] representing the delta value between the output and the corresponding input value, as the following $$qp\_out\_val\_diff\_in[i][j]=qp\_in\_val[i][j]-qp\_out\_val[i][j] \quad (2)$$

or $$qp\_out\_val\_diff\_in[i][j]=qp\_out\_val[i][j]-qp\_in\_val[i][j] \quad (3)$$

where syntax element qp_in_val[i][j] and syntax element qp_out_val[i][j] represent the input values and output values of the control points.

Without loss of generality, assume the function (2) is used and the corresponding proposed syntax structure is showed in Table 5 (emphasis shown in italics) of FIG. 10. The derivation of the i-th chroma QP mapping table ChromaQpTable[i] for i=0, 1, or 2 is detailed in the Table 6 (emphases shown in italics) of FIG. 11. The highlighted steps are different from the VVC draft 6 using the proposed syntax.

Taking the mapping relationship 700 in FIG. 7 as an example, the signaled values of the VVC draft 6 and the proposed method are showed in Table 7 of FIG. 12. It can be seen that the proposed syntax element qp_out_val_diffin has smaller values and hence requires fewer bits to be coded.

In some embodiments, the differences between delta input values and delta output values are signaled. Specifically, in VVC draft 6, syntax elements delta_qp_in_val_minus1[i][j] and delta_qp_out_val[i][j] are transmitted to signal the delta input and output values of each piece of the mapping function. Here, instead of transmitting the delta output values directly, the delta output values are signaled as syntax element diff_delta_in_delta_out[i][j] according to the following:

$$diff\_delta\_in\_delta\_out[i][j]=delta\_qp\_in\_val[i][j]- \\ delta\_qp\_out\_val[i][j] \quad (4)$$

or $$diff\_delta\_in\_delta\_out[i][j]=delta\_qp\_out\_val[i][j]- \\ delta\_qp\_in\_val[i][j] \quad (5),$$

where syntax elements delta_qp_in_val[i][j] and delta_qp_out_val[i][j] represent the delta input values and the delta output values between two consecutive control points.

Without loss of generality, assuming the function (4) is used and the corresponding proposed syntax structure is showed in Table 8 (emphases shown in italics) of FIG. 13. The derivation of the i-th chroma QP mapping table ChromaQpTable[i] for i=0, 1, or 2 is detailed in the Table 9 (emphases shown in italics) of FIG. 14. The highlighted steps are different from the VVC draft 6 using the proposed syntax.

Taking the piece-wise linear function in FIG. 7 as an example, the signaled values of the VVC draft 6 and the proposed method are showed in Table 10 of FIG. 15. It can be seen that the proposed syntax element diff_delta_in_delta_out has smaller values and hence requires fewer bits to be coded.

In some embodiments, constraints can be used when the output values are signaled. The motivation for the luma-to-chroma mapping relationship is to let the chroma QP values increase more slowly than the luma QP values for medium to high quantization level. Therefore, the output values of control points are identical or smaller than the corrreponding input values in most cases. To further reduce the coding bits for signaling the mapping relationship, new syntax elements are proposed to limit the sign of syntax element qp_out_val_diffm[i][j] or syntax element diff_delta_in_delta_out [i][j].

Without loss of generality, take syntax element qp_out_val_diffin[i][j] using function (2) as an example. The proposed syntax structure is detailed in Table 11 (emphases shown in italics) of FIG. 16. Syntax element out_val_cross_sign_flag[i] equals to 1 can specify that syntax element qp_out_val_diffin[i][j] include both positive and negative values, and then syntax element qp_out_val_diffin[i][j] can be coded by se(v) for this case. Syntax element out_val_cross_sign_flag[i] equals to 0 can specify that all non-zero syntax elements qp_out_val_diffin[i][j] own the same sign. The syntax element out_val_sign_flag[i] is coded successively to denote whether positive or negative and then syntax element qp_out_val_diffin[i][j] is coded by ue(v) for this case. Syntax element out_val_sign_flag[i] equals to 0 represents the positive value. Syntax element out_val_sign_flag[I] equals to 1 represents the negative value.

Taking the mapping relationship 700 in FIG. 7 as an example, the signaled values of the VVC draft 6 and the proposed method are showed in Table 12 of FIG. 17. It can be seen that the new proposed syntax requires fewer coding bits to signal the mapping relationship compared to VVC draft 6 and the previous proposed method of Table 7 of FIG. 12.

In the VVC draft 6, the chroma QP tables are derived based on the control points signaled by the syntax elements num_points_in_qp_table_minus1, delta_qp_in_val_minus1 and delta_qp_out_val. However, only the intermediate piece between control points are adjusted. With respect to the leftmost mapping piece with the input ranges [−QpBdOffsetc, 33) and the rightmost mapping piece with the input range (44, 63], their slopes are fixed to 1.

Figure 18:
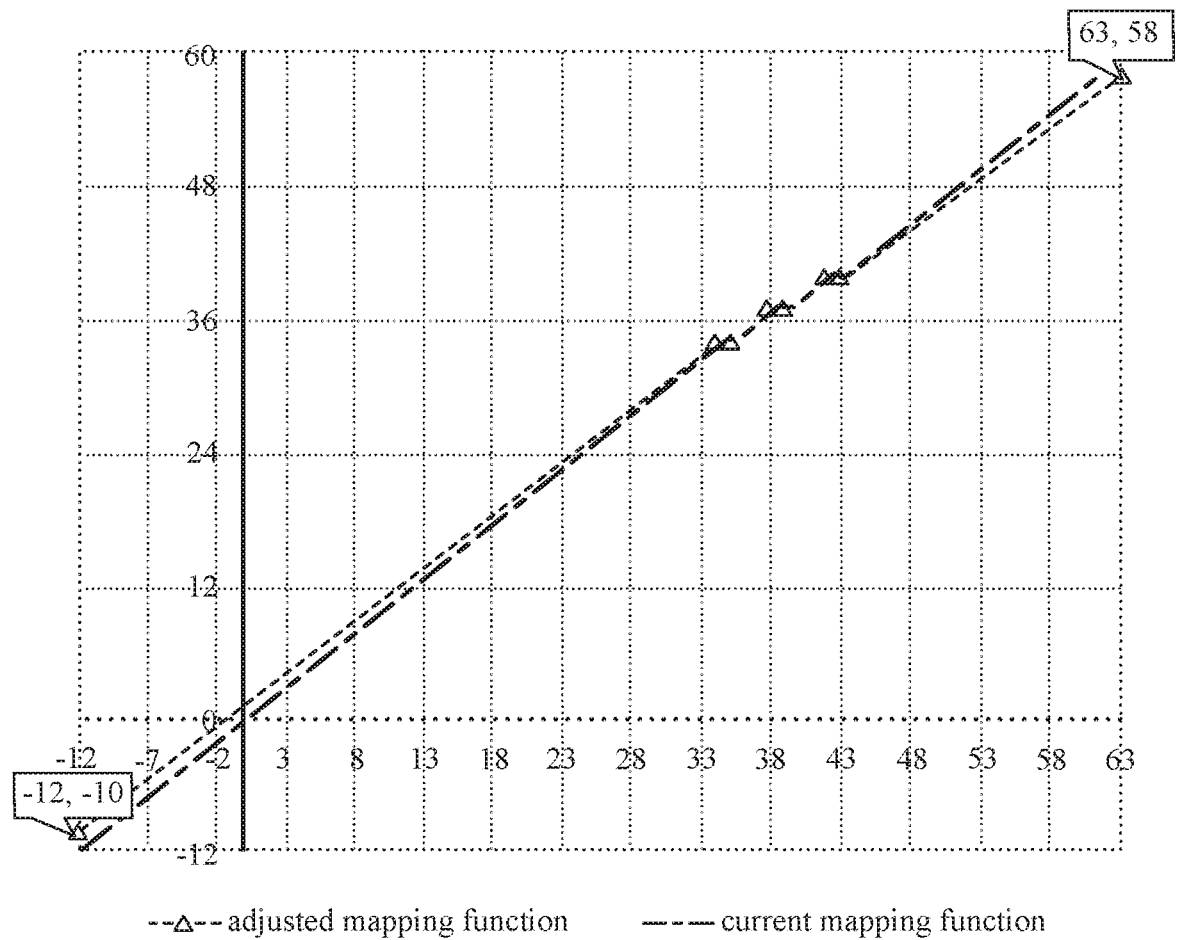
FIG. 18 illustrates an exemplary derivation of a chroma QP table, according to some embodiments of the present disclosure.

To support the flexible leftmost and rightmost mapping pieces, two additional boundary points with input values equaling to −QpBdOffsetc and 63 are signaled. The output values of these two boundary points can be adjusted flexibly, e.g. (−12, −10) and (63, 58) in FIG. 18. Considering the input values of the boundary points are fixed to the left and right boundaries of the input range, only the output values of the boundary points need to be signaled.

The proposed syntax structure is shownin Table 13 (emphases shown in italics) of FIG. 19. Syntax element delta_qp_out_val [i][0] denotes the delta output value compared to -QpBdOffsetc of the left boundary point. Syntax element delta_qp_out_val [i][num_points_in_qp_table_minus1[i]+2] denotes the delta output values of the right boundary point compared to the previous control point. Based on the new syntax structure, the derivation of chroma QP tables is shown in Table 14 (emphases shown in italics) of FIG. 20.

When the syntax element qp_table_for_chroma_present_flag is equal to 0, no chroma QP table may be present in the bitstream and the default settings representing the mapping function of FIG. 7 may be used to derive the chroma QP tables for Cb, Cr and joint CbCr. The default num_points_in_qp_table_minus[0] is set to 1, and exemplary default values of delta_qp_in_val_minus1[0][2] and delta_qp_out_val [0][2] are shown in Table 15 of FIG. 21. The default chroma QP table applies to the Cb, Cr and joint CbCr residuals.

If the proposed syntax referred to above with respect to the signaling of the derivation of the the chroma QP table is used, the exemplary default settings can be set as shown in Table 16 of FIG. 22.

If the proposed method described above with respect to the derivation of the leftmost and rightmost pieces is used, the other exemplary default settings can be set as shown in Table 17 of FIG. 23.

These default values (in Table 15 of FIG. 21, Table 16 of FIG. 22, or Table 17 of FIG. 23) may be included in the semantics of the syntax element qp_table_for_chroma_present_flag to specify how to set the default values of the number of pieces and the input and output delta values when no chroma QP table is signaled explicitly. The benefit is not only reduced signaling overhead in the SPS, but also this default table defines a default behavior for encoders that do not want or know how to set the values of chroma QP tables, since H.264 and HEVC encoders are not required to send such tables explicitly.

In VVC draft 6, the number of control points are specified by the syntax element num_points_in_qp_table_minus1[i]. Considering syntax element num_points_in_qp_table_minus1[i] is equal or larger than 0, at least one control point is transmitted. Actually, the mapping relationship is a sole-piece mapping function if no control point is signaled. Table 18 of FIG. 24 shows a new syntax structure to support this case, according to an exemplary embodiment (emphases shown in italics). Syntax element num_points_in_qp_table [i] is used to signal the number of control points and transmit the control points when syntax element num_points_in_qp_table[i] is larger than zero.

Note that to one of ordinary skill in the art, one or more of the disclosed methods may be used in combination or may be used separately. For example, the syntax corresponding to the derivation of the chroma QP table may be used in combination with the syntax corresponding to the derivation of the leftmost and rightmost pieces. As another example, the above described presence flags may be used separately without changing the control point signaling.

Figure 25:
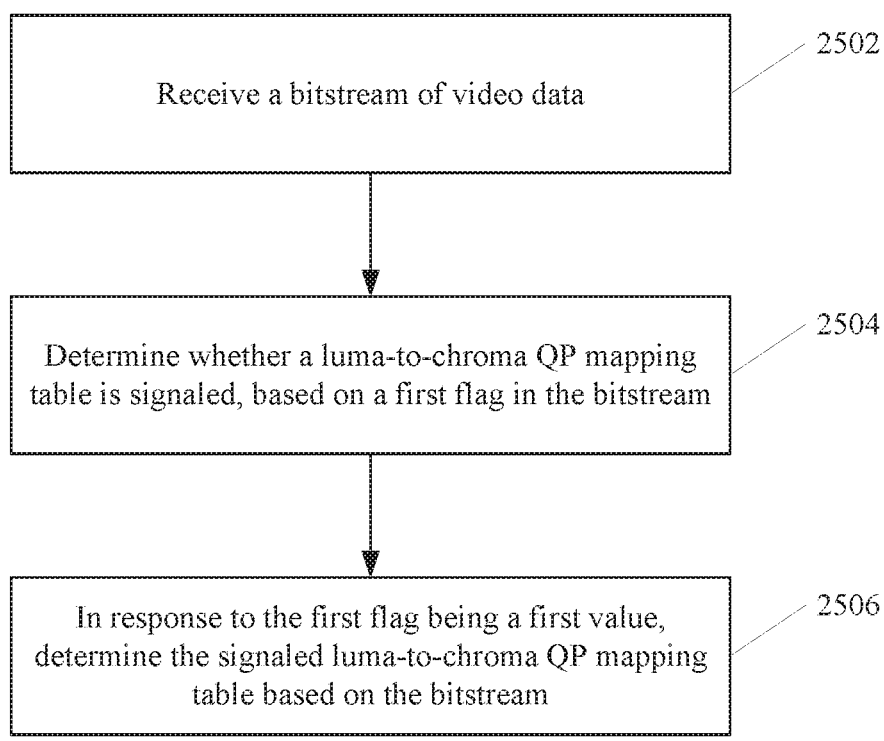
FIG. 25 illustrates a flowchart of a first exemplary video decoding method, according to some embodiments of the present disclosure.

FIG. 25 illustrates a flowchart of an exemplary video decoding method 2500, according to some embodiments of the present disclosure. In some embodiments, method 2500 can be performed by a decoder (e.g., decoder 300 of FIG. 3) or performed by one or more software or hardware components of an apparatus (e.g., apparatus 400 of FIG. 4). For example, a processor (e.g., processor 402 of FIG. 4) can perform method 2500. In some embodiments, method 2500 can be implemented by a computer program product, embodied in a computer-readable medium, including computer-executable instructions, such as program code, executed by computers (e.g., apparatus 400 of FIG. 4).

At step 2502, method 2500 can include receiving a bitstream of video data. The bitstream of video data is to be decoded, e.g., bitstream 302 of FIG. 3.

At step 2504, method 2500 can include determining whether a luma-to-chroma QP mapping table is signaled, based on a first flag in the bitstream. For example, the first flag in the bitstream can be syntax element qp_table_for_chroma_present_flag described above.

At step 2506, method 2500 can include in response to the first flag being a first value, determining the signaled luma-to-chroma QP mapping table based on the bitstream. For example, syntax element qp_table_for_chroma_present_flag equal to 1 can specify that at least one luma-to-chroma QP mapping table is signaled. In some embodiments, determining the signaled luma-to-chroma QP mapping table based on the bitstream can include determining, based on the bitstream, a signaled mapping function, and determining the signaled luma-to-chroma QP mapping table based on the signaled mapping function. Determining the signaled mapping function can include determining the signaled mapping function based on a control point. Moreover, method 2500 can include determining, based on the bitstream, at least one of a luma input value or a chroma output value associated with the control point. For example, the signaled luma-to-chroma QP mapping table can be determined according to Table 3 of FIG. 8, Table 6 of FIG. 11, Table 9 of FIG. 14, Table 14 of FIG. 20, or the like.

In some embodiments, method 2500 can include in response to the first flag being a second value, determining a luma-to-chroma QP mapping table based on a default mapping function. For example, syntax element qp_table_for_chroma_present_flag equal to 0 can specify that the chroma QP tables are not present. A luma-to-chroma QP mapping table can be determined based on a default mapping function described above.

In some embodiments, method 2500 can further include determining a number of luma-to-chroma QP mapping tables that are signaled in the bitstream, based on a second flag in the bitstream. In response to the second flag being a third value, method 2500 can include determining that the signaled luma-to-chroma QP mapping table applies to both a first chroma component and a second chroma component. In response to the second flag being a fourth value, method 2500 can include determining that signaled luma-to-chroma QP mapping table comprises a first table applying to the first chroma component and a second table applying to the second chroma component. The first chroma component can be a Cb component, and the second chroma component can be a Cr component. In some embodiments, the second flag can be syntax element same_qp_table_for_cbcr described above. For example, syntax element same_qp_table_for_cbcr equal to 1 can specify that only one luma-to-chroma QP mapping table is signaled and applied to both Cb and Cr components, while syntax element And syntax element same_qp_table_for_cbcr equal to 0 can specify that two luma-to-chroma QP mapping tables are signaled for the Cb and Cr components separately.

In some embodiments, method 2500 can also include determining whether a luma-to-chroma QP mapping table for joint CbCr residues is signaled, based on a third flag in the bitstream. In response to the third flag being a fifth value, method 2500 can include determining the signaled luma-to-chroma QP mapping table for the joint CbCr residues. In response to the third flag being a sixth value, method 2500 can include determining a luma-to-chroma QP mapping table for the joint CbCr residues, by averaging a first luma-to-chroma QP mapping table for Cb residues and a second luma-to-chroma QP mapping table for Cr residues. In some embodiments, the third flag can be syntax element qp_table_for_jointcbcr_present_flag described above. For example, syntax element qp_table_for_jointcbcr_present_flag equal to 1 can specify that the luma-to-chroma QP mapping table for the joint CbCr residuals is signaled, and syntax element qp_table_forjointcbcr_present_flag equal to 0 can specify that the luma-to-chroma QP mapping table applied to joint CbCr residuals is not present. If luma-to-chroma QP mapping table for joint CbCr residuals is not present, the luma-to-chroma QP mapping table for the joint CbCr residuals can be derived by averaging the luma-to-chroma QP mapping tables for the Cb and Cr residuals.

Figure 26:
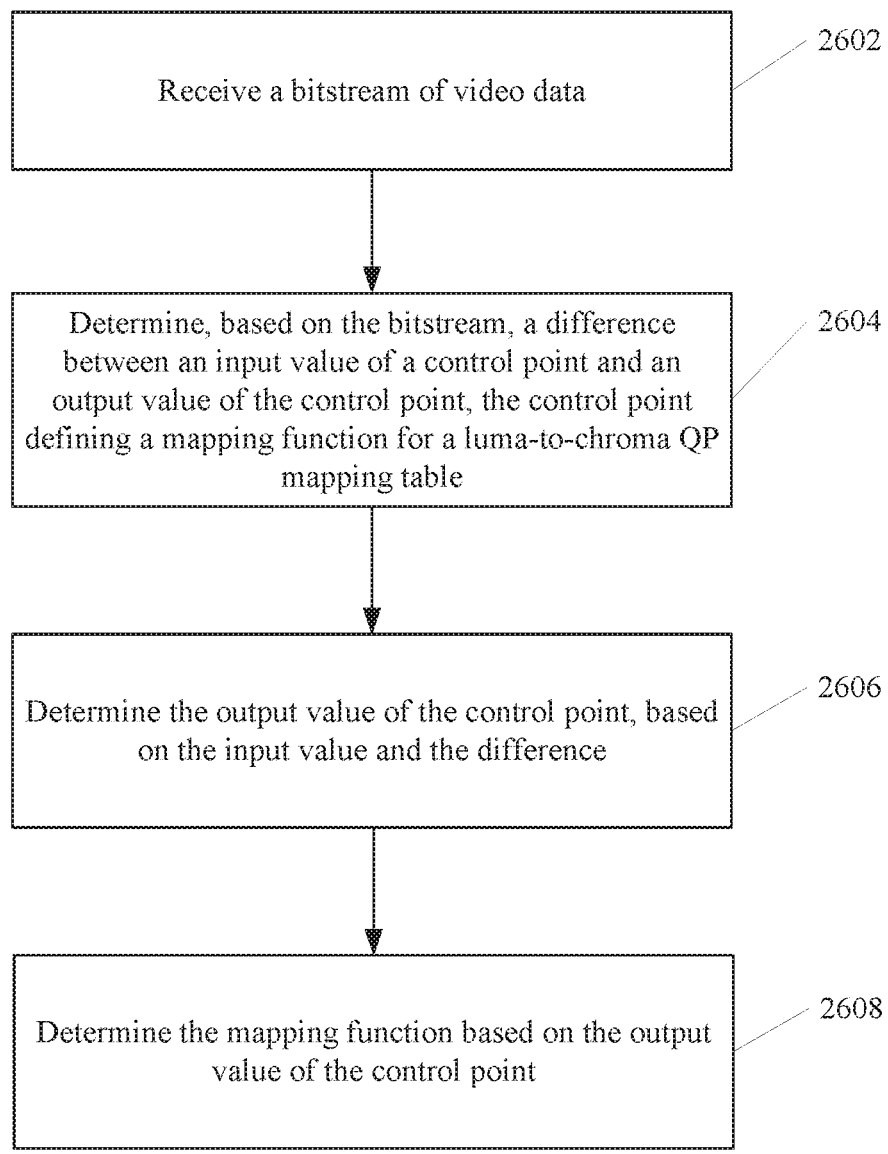
FIG. 26 illustrates a flowchart of a second exemplary video decoding method, according to some embodiments of the present disclosure.

FIG. 26 illustrates a flowchart of an exemplary video decoding method 2600, according to some embodiments of the present disclosure. In some embodiments, method 2600 can be performed by a decoder (e.g., decoder 300 of FIG. 3) or performed by one or more software or hardware components of an apparatus (e.g., apparatus 400 of FIG. 4). For example, a processor (e.g., processor 402 of FIG. 4) can perform method 2600. In some embodiments, method 2600 can be implemented by a computer program product, embodied in a computer-readable medium, including computer-executable instructions, such as program code, executed by computers (e.g., apparatus 400 of FIG. 4).

At step 2602, method 2600 can include receiving a bitstream of video data. The bitstream of video data is to be decoded, e.g., bitstream 302 of FIG. 3.

At step 2604, method 2600 can include determining, based on the bitstream, a difference between an input value of a control point and an output value of the control point. The control point defines a mapping function for a luma-to-chroma QP mapping table. For example, the difference can be syntax element qp_out_val_diff_in described above with reference to function (2) or (3).

At step 2606, method 2600 can include determining the output value of the control point, based on the input value and the difference. And at step 808, method 800 can include determining the mapping function based on the output value of the control point. For example, the mapping function can be determined according to Table 6 of FIG. 11.

In some embodiments, method 2600 can further include determining whether the luma-to-chroma QP mapping table is signaled, based on a table-present flag in the bitstream. Method 2600 can also include in response to the table-present flag being a first value, determining the signaled luma-to-chroma QP mapping table based on the mapping function, or in response to the table-present flag being a second value, determining a luma-to-chroma QP mapping table based on a default mapping function. In some embodiments, the table-present flag in the bitstream can be syntax element qp_table_for_chroma_present_flag described above. For example, syntax element qp_table_for_chroma_present_flag equal to 1 can specify that at least one luma-to-chroma QP mapping table is signaled, while syntax element qp_table_for_chroma_present_flag equal to 0 can specify that the chroma QP tables are not present. The default mapping function can be determined (as described above) for deriving the chroma QP tables for for Cb, Cr and joint CbCr.

Figure 27:
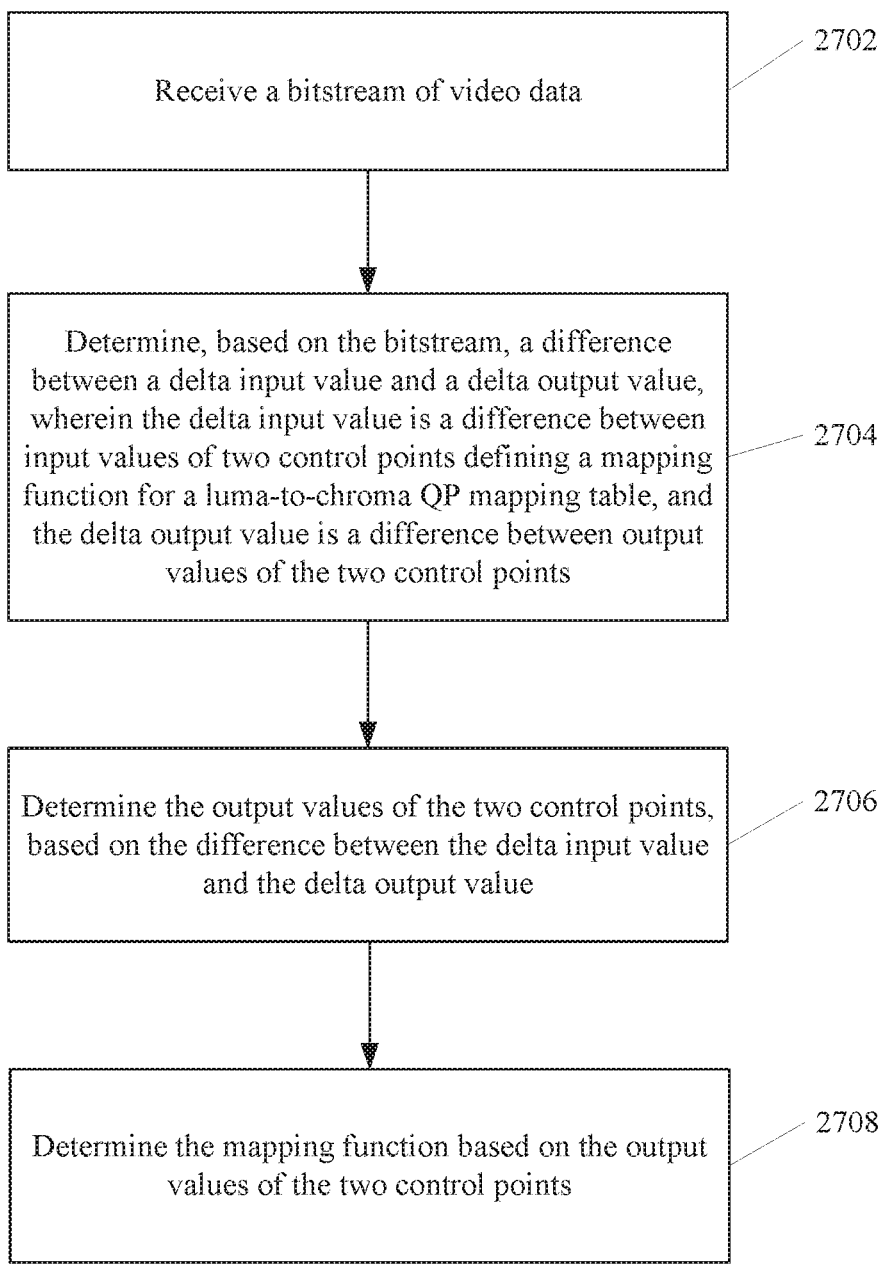
FIG. 27 illustrates a flowchart of a third exemplary video decoding method, according to some embodiments of the present disclosure.

FIG. 27 illustrates a flowchart of an exemplary video decoding method 2700, according to some embodiments of the present disclosure. In some embodiments, method 2700 can be performed by a decoder (e.g., decoder 300 of FIG. 3) or performed by one or more software or hardware components of an apparatus (e.g., apparatus 400 of FIG. 4). For example, a processor (e.g., processor 402 of FIG. 4) can perform method 2700. In some embodiments, method 2700 can be implemented by a computer program product, embodied in a computer-readable medium, including computer-executable instructions, such as program code, executed by computers (e.g., apparatus 400 of FIG. 4).

At step 2702, method 2700 can include receiving a bitstream of video data. The bitstream of video data is to be decoded, e.g., bitstream 302 of FIG. 3.

At step 2704, method 2700 can include determining, based on the bitstream, a difference between a delta input value and a delta output value. The delta input value can be a difference between input values of two control points, and the delta output value can be a difference between output values of the two control points. The control points define a mapping function for a luma-to-chroma QP mapping table. For example, the difference can be syntax element diff_delta_in_delta_out described above with reference to function (4) or (5).

At step 2706, method 2700 can include determining the output values of the two control points, based on the difference between the delta input value and the delta output value. And at step 2708, method 2700 can include determining the mapping function based on the output values of the two control points. For example, the mapping function can be determined according to Table 9 of FIG. 14.

In some embodiments, method 2700 can further include determining whether the luma-to-chroma QP mapping table is signaled, based on a table-present flag in the bitstream. Method 2700 can also include in response to the table-present flag being a first value, determining the signaled luma-to-chroma QP mapping table based on the mapping function, or in response to the table-present flag being a second value, determining a luma-to-chroma QP mapping table based on a default mapping function. In some embodiments, the table-present flag in the bitstream can be syntax element qp_table_for_chroma_present_flag described above. For example, syntax element qp_table_for_chroma_present_flag equal to 1 can specify that at least one luma-to-chroma QP mapping table is signaled, while syntax element qp_table_for_chroma_present_flag equal to 0 can specify that the chroma QP tables are not present. The default mapping function can be determined (as described above) for deriving the chroma QP tables for for Cb, Cr and joint CbCr.

Figure 28:
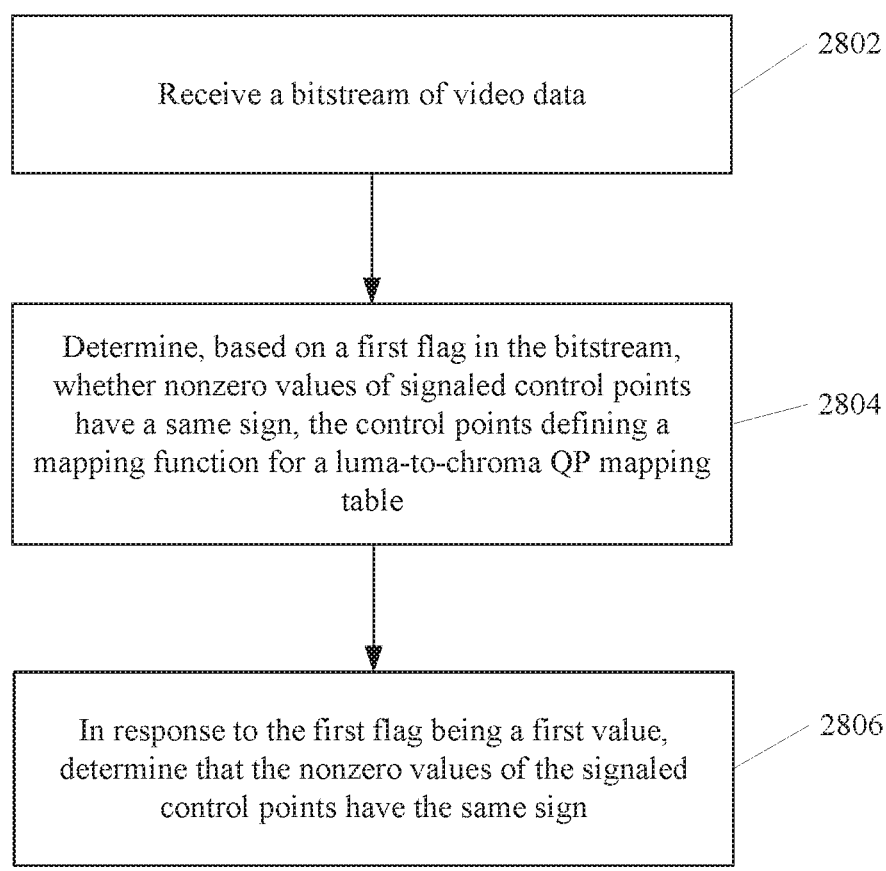
FIG. 28 illustrates a flowchart of a fourth exemplary video decoding method, according to some embodiments of the present disclosure.

FIG. 28 illustrates a flowchart of an exemplary video decoding method 2800, according to some embodiments of the present disclosure. In some embodiments, method 2800 can be performed by a decoder (e.g., decoder 300 of FIG. 3) or performed by one or more software or hardware components of an apparatus (e.g., apparatus 400 of FIG. 4). For example, a processor (e.g., processor 402 of FIG. 4) can perform method 2800. In some embodiments, method 2800 can be implemented by a computer program product, embodied in a computer-readable medium, including computer-executable instructions, such as program code, executed by computers (e.g., apparatus 400 of FIG. 4).

At step 2802, method 2800 can include receiving a bitstream of video data. The bitstream of video data is to be decoded, e.g., bitstream 302 of FIG. 3.

At step 2804, method 2800 can include determining, based on a first flag in the bitstream, whether nonzero values of signaled control points have a same sign. The control points define a mapping function for a luma-to-chroma QP mapping table.

At step 2806, method 2800 can include in response to the first flag being a first value, determining that the nonzero values of the signaled control points have the same sign. Method 2800 can also include in response to the nonzero values of the signaled control points being determined to have the same sign, determining, based on a second flag in the bitstream, whether the sign is positive or negative. In some embodiments, the first flag can be syntax element out_val_cross_sign_flag and the second flag can be syntax element out_val_sign_flag, as described above. For example, syntax element out_val_cross_sign_flag equal to 1 can specify that syntax element qp_out_val_diffin include both positive and negative values, and syntax element out_val_cross_sign_flag equal to 0 can specify that all non-zero qp_out_val_diffin have the same sign. The syntax element out_val_sign_flag can be coded to denote whether non-zero qp_out_val_diffin are positive or negative. For example, syntax element out_val_sign_flag equal to 0 represents the positive value, while syntax element out_val_sign_flag equal to 1 represents the negative value.

In some embodiments, method 2800 can further include determining whether the luma-to-chroma QP mapping table is signaled, based on a table-present flag in the bitstream. Method 1000 can also include in response to the table-present flag being a first value, determining the signaled luma-to-chroma QP mapping table based on the mapping function, or in response to the table-present flag being a second value, determining a luma-to-chroma QP mapping table based on a default mapping function. In some embodiments, the table-present flag in the bitstream can be syntax element qp_table_for_chroma_present_flag described above. For example, syntax element qp_table_for_chroma_present_flag equal to 1 can specify that at least one luma-to-chroma QP mapping table is signaled, while syntax element qp_table_for_chroma_present_flag equal to 0 can specify that the chroma QP tables are not present. The default mapping function can be determined (as described above) for deriving the chroma QP tables for for Cb, Cr and joint CbCr.

Figure 29:
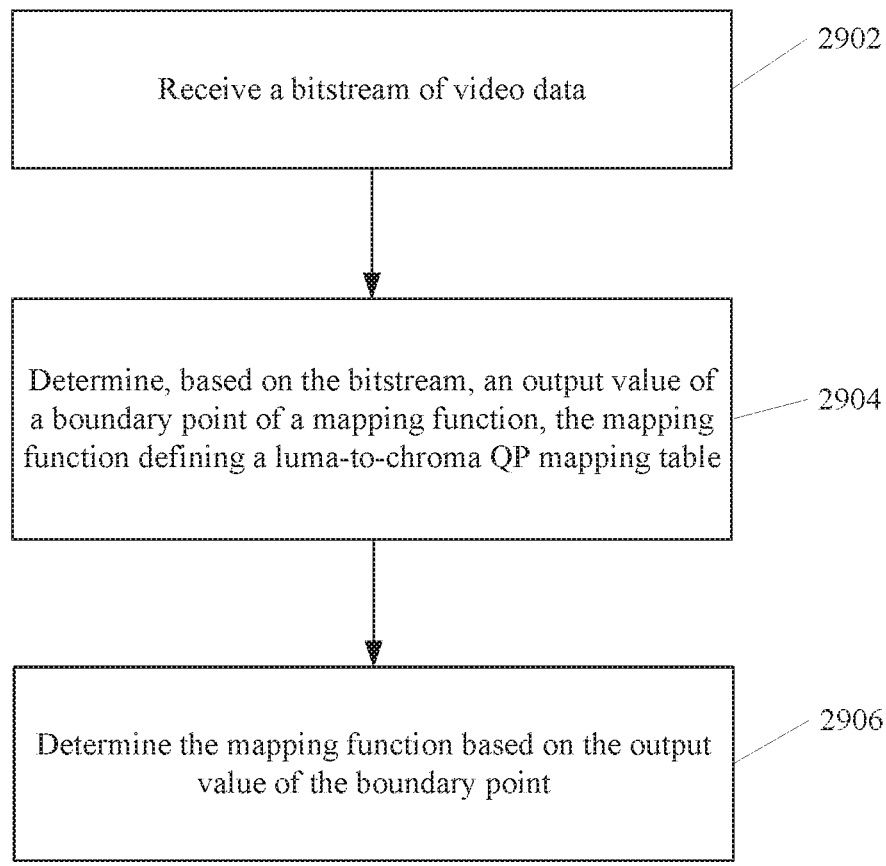
FIG. 29 illustrates a flowchart of a fifth exemplary video decoding method, according to some embodiments of the present disclosure.

FIG. 29 illustrates a flowchart of an exemplary video decoding method 2900, according to some embodiments of the present disclosure. In some embodiments, method 2900 can be performed by a decoder (e.g., decoder 300 of FIG. 3) or performed by one or more software or hardware components of an apparatus (e.g., apparatus 400 of FIG. 4). For example, a processor (e.g., processor 402 of FIG. 4) can perform method 2900. In some embodiments, method 2900 can be implemented by a computer program product, embodied in a computer-readable medium, including computer-executable instructions, such as program code, executed by computers (e.g., apparatus 400 of FIG. 4).

At step 2902, method 2900 can include receiving a bitstream of video data. The bitstream of video data is to be decoded, e.g., bitstream 302 of FIG. 3.

At step 2904, method 2900 can include determining, based on the bitstream, an output value of a boundary point of a mapping function. The mapping function defines a luma-to-chroma QP mapping table. At step 2906, method 2900 can include determining the mapping function based on the output value of the boundary point. For example, the mapping function can be determined according to Table 14 of FIG. 20.

In some embodiments, method 2900 can include determining an input value of the boundary point based on a default value, and determining the mapping function based on the input value of the boundary point.

In some embodiments, method 2900 can further include determining whether the luma-to-chroma QP mapping table is signaled, based on a table-present flag in the bitstream. Method 2900 can also include in response to the table-present flag being a first value, determining the signaled luma-to-chroma QP mapping table based on the mapping function, or in response to the table-present flag being a second value, determining a luma-to-chroma QP mapping table based on a default mapping function. In some embodiments, the table-present flag in the bitstream can be syntax element qp_table_for_chroma_present_flag described above. For example, syntax element qp_table_for_chroma_present_flag equal to 1 can specify that at least one luma-to-chroma QP mapping table is signaled, while syntax element qp_table_for_chroma_present_flag equal to 0 can specify that the chroma QP tables are not present. The default mapping function can be determined as described above.

Figure 30:
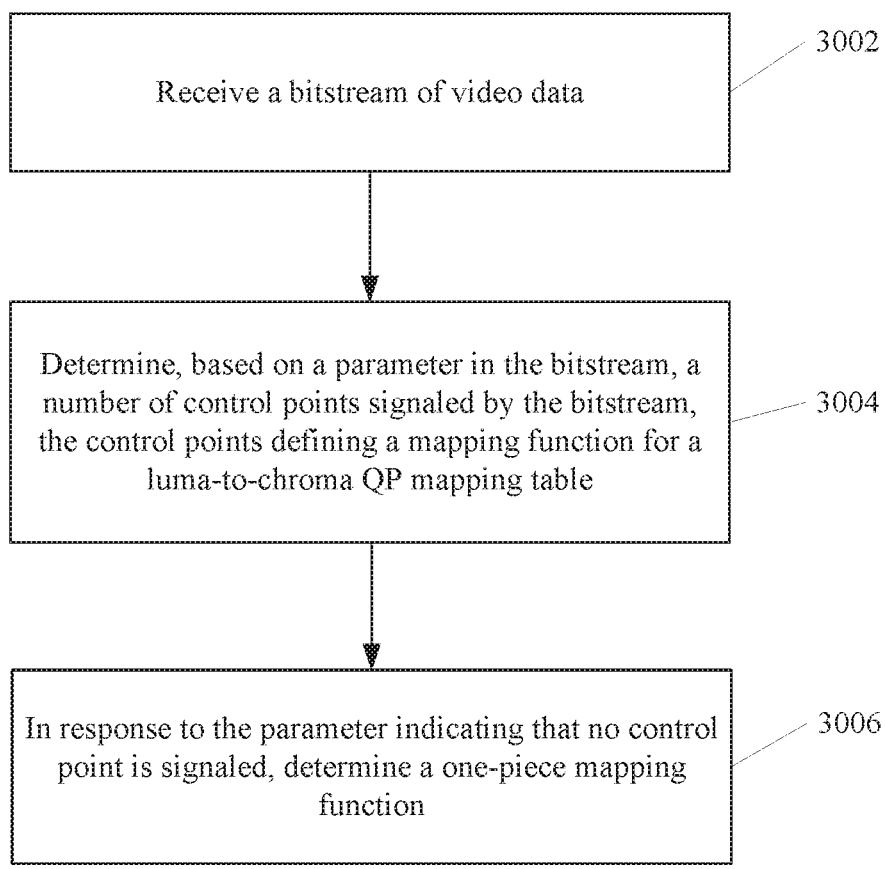
FIG. 30 illustrates a flowchart of a sixth exemplary video decoding method, according to some embodiments of the present disclosure.

FIG. 30 illustrates a flowchart of an exemplary video decoding method 3000, according to some embodiments of the present disclosure. In some embodiments, method 3000 can be performed by a decoder (e.g., decoder 300 of FIG. 3) or performed by one or more software or hardware components of an apparatus (e.g., apparatus 400 of FIG. 4). For example, a processor (e.g., processor 402 of FIG. 4) can perform method 3000. In some embodiments, method 3000 can be implemented by a computer program product, embodied in a computer-readable medium, including computer-executable instructions, such as program code, executed by computers (e.g., apparatus 400 of FIG. 4).

At step 3002, method 3000 can include receiving a bitstream of video data. The bitstream of video data is to be decoded, e.g., bitstream 302 of FIG. 3.

At step 3004, method 3000 can include determining, based on a parameter in the bitstream, a number of control points signaled by the bitstream. The control points define a mapping function for a luma-to-chroma QP mapping table. At step 3006, method 3000 can include in response to the parameter indicating that no control point is signaled, determining a one-piece mapping function. In some embodiments, the parameter can be syntax element num_points_in_qp_table to indicate the number of signaled control points described above. For example, syntax element num_points_in_qp_table equal to zero can specify that no control point is signaled.

Figure 31:
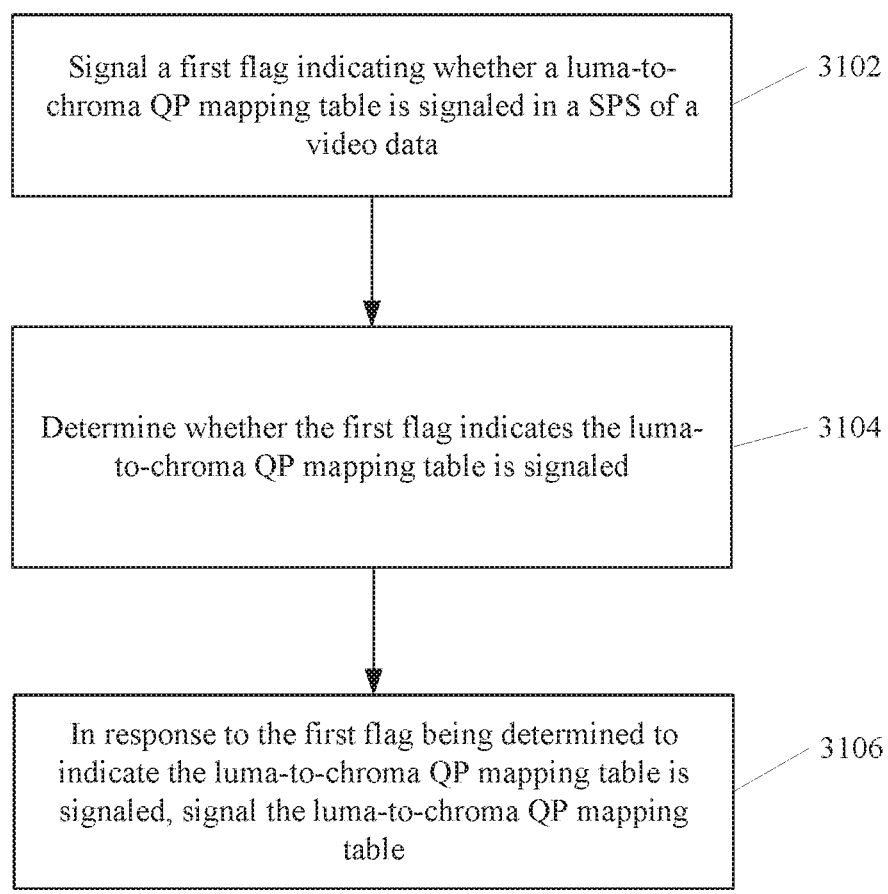
FIG. 31 illustrates a flowchart of a first exemplary video processing method, according to some embodiments of the present disclosure.

FIG. 31 illustrates a flowchart of an exemplary video processing method 3100, according to some embodiments of the present disclosure. In some embodiments, method 3100 can be performed by an encoder (e.g., encoder 200 of FIG. 2), a decoder (e.g., decoder 300 of FIG. 3) or performed by one or more software or hardware components of an apparatus (e.g., apparatus 400 of FIG. 4). For example, a processor (e.g., processor 402 of FIG. 4) can perform method 3100. In some embodiments, method 3100 can be implemented by a computer program product, embodied in a computer-readable medium, including computer-executable instructions, such as program code, executed by computers (e.g., apparatus 400 of FIG. 4).

At step 3102, method 3100 can include signaling a first flag indicating whether a luma-to-chroma QP mapping table is signaled in a SPS of a video data. For example, the first flag can be syntax element qp_table_for_chroma_present_flag described above.

At step 3104, method 3100 can include determining whether the first flag indicates the luma-to-chroma QP mapping table is signaled. For example, syntax element qp_table_for_chroma_present_flag equal to 1 can specify that at least one luma-to-chroma QP mapping table is signaled, while syntax element qp_table_for_chroma_present_flag equal to 0 can specify that the chroma QP tables are not present.

At step 3106, method 3100 can include in response to the first flag being determined to indicate the luma-to-chroma QP mapping table is signaled, signaling the luma-to-chroma QP mapping table.

In some embodiments, the luma-to-chroma QP mapping table can be determined based on a default mapping function described above in response to the first flag being determined to indicate the luma-to-chroma QP mapping table is not signaled.

In some embodiments, method 3100 can include in response to the first flag being determined to indicate the luma-to-chroma QP mapping table is signaled, signaling a second flag. The second flag can indicate whether one luma-to-chroma QP mapping table for a Cb component and a Cr component is signaled or a first luma-to-chroma QP mapping table for the Cb component and a second luma-to-chroma QP mapping table for the Cr component are signaled. For example, the second flag can be syntax element same_qp_table_for_cbcr described above. For example, syntax element same_qp_table_for_cbcr equal to 1 can specify that only one luma-to-chroma QP mapping table is signaled and applied to both Cb and Cr components, while syntax element And syntax element same_qp_table_for_cbcr equal to 0 can specify that two luma-to-chroma QP mapping tables are signaled for the Cb and Cr components separately.

In some embodiments, method 3100 can include in response to the first flag being determined to indicate the luma-to-chroma QP mapping table is signaled, signaling a third flag indicating whether a luma-to-chroma QP mapping table for joint CbCr residues is signaled. For example, the third flag can be syntax element qp_table_for_jointcbcr_present_flag described above. For example, syntax element qp_table_for_jointcbcr_present_flag equal to 1 can specify that the luma-to-chroma QP mapping table for the joint CbCr residuals is signaled, and syntax element qp_table_for_jointcbcr_present_flag equal to 0 can specify that the luma-to-chroma QP mapping table applied to joint CbCr residuals is not present. If luma-to-chroma QP mapping table for joint CbCr residuals is not present, the luma-to-chroma QP mapping table for the joint CbCr residuals can be derived by averaging the luma-to-chroma QP mapping tables for the Cb and Cr residuals.

Figure 32:
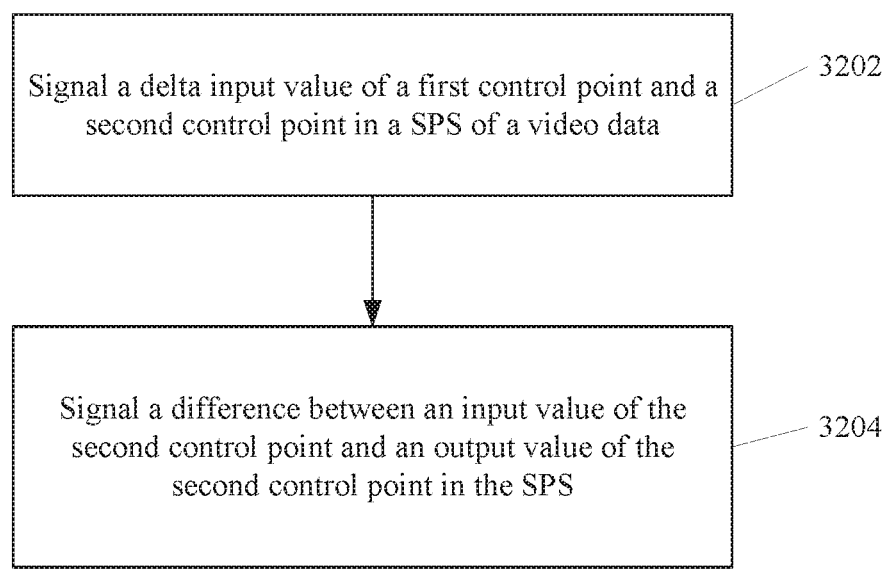
FIG. 32 illustrates a flowchart of a second exemplary video processing method, according to some embodiments of the present disclosure.

FIG. 32 illustrates a flowchart of an exemplary video processing method 3200, according to some embodiments of the present disclosure. In some embodiments, method 3200 can be performed by an encoder (e.g., encoder 200 of FIG. 2), a decoder (e.g., decoder 300 of FIG. 3) or performed by one or more software or hardware components of an apparatus (e.g., apparatus 400 of FIG. 4). For example, a processor (e.g., processor 402 of FIG. 4) can perform method 3200. In some embodiments, method 3200 can be implemented by a computer program product, embodied in a computer-readable medium, including computer-executable instructions, such as program code, executed by computers (e.g., apparatus 400 of FIG. 4).

At step 3202, method 3200 can include signaling a delta input value of a first control point and a second control point in a SPS of a video data. The delta input value is a difference between input values of the first and second control points. The first and second points can define a mapping function for a luma-to-chroma QP mapping table. For example, the delta input value can be syntax element delta_qp_in_val_minus described above.

At step 3204, method 3200 can include signaling a difference between an input value of the second control point and an output value of the second control point in the SPS. For example, the difference can be syntax element qp_out_val_diff_in described above with reference to function (2) or (3).

Figure 33:
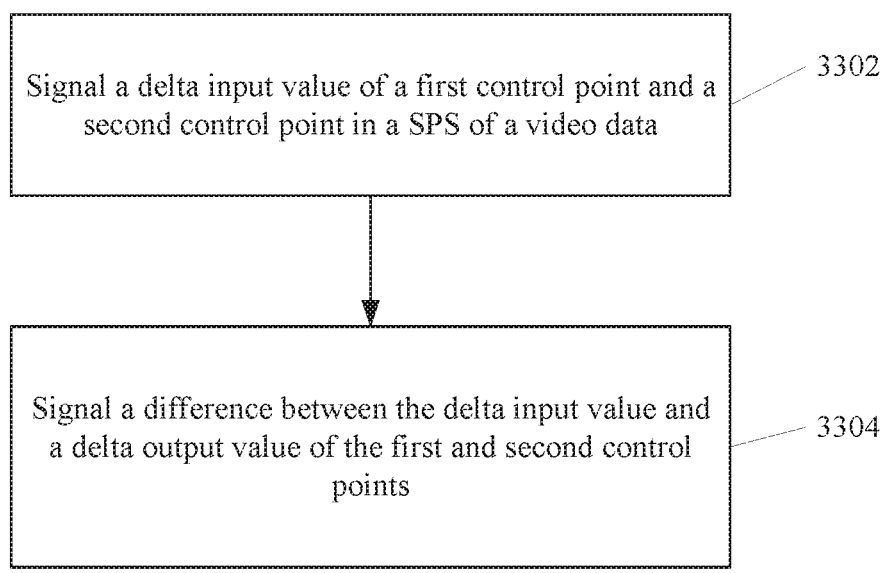
FIG. 33 illustrates a flowchart of a third exemplary video processing method, according to some embodiments of the present disclosure.

FIG. 33 illustrates a flowchart of an exemplary video processing method 3300, according to some embodiments of the present disclosure. In some embodiments, method 3300 can be performed by an encoder (e.g., encoder 200 of FIG. 2), a decoder (e.g., decoder 300 of FIG. 3) or performed by one or more software or hardware components of an apparatus (e.g., apparatus 400 of FIG. 4). For example, a processor (e.g., processor 402 of FIG. 4) can perform method 3300. In some embodiments, method 3300 can be implemented by a computer program product, embodied in a computer-readable medium, including computer-executable instructions, such as program code, executed by computers (e.g., apparatus 400 of FIG. 4).

At step 3302, method 3300 can include signaling a delta input value of a first control point and a second control point in a SPS of a video data. The delta input value is a difference between input values of the first and second control points. The first and second control points can define a mapping function for a luma-to-chroma quantization parameter (QP) mapping table. For example, the delta input value can be syntax element delta_qp_in_val_minus1 described above.

At step 3304, method 3300 can include signaling a difference between the delta input value and a delta output value of the first and second control points. The delta output value is a difference between output values of the first and second control points. For example, the difference can be syntax element diff_delta_in_delta_out described above with reference to function (4) or (5).

Figure 34:
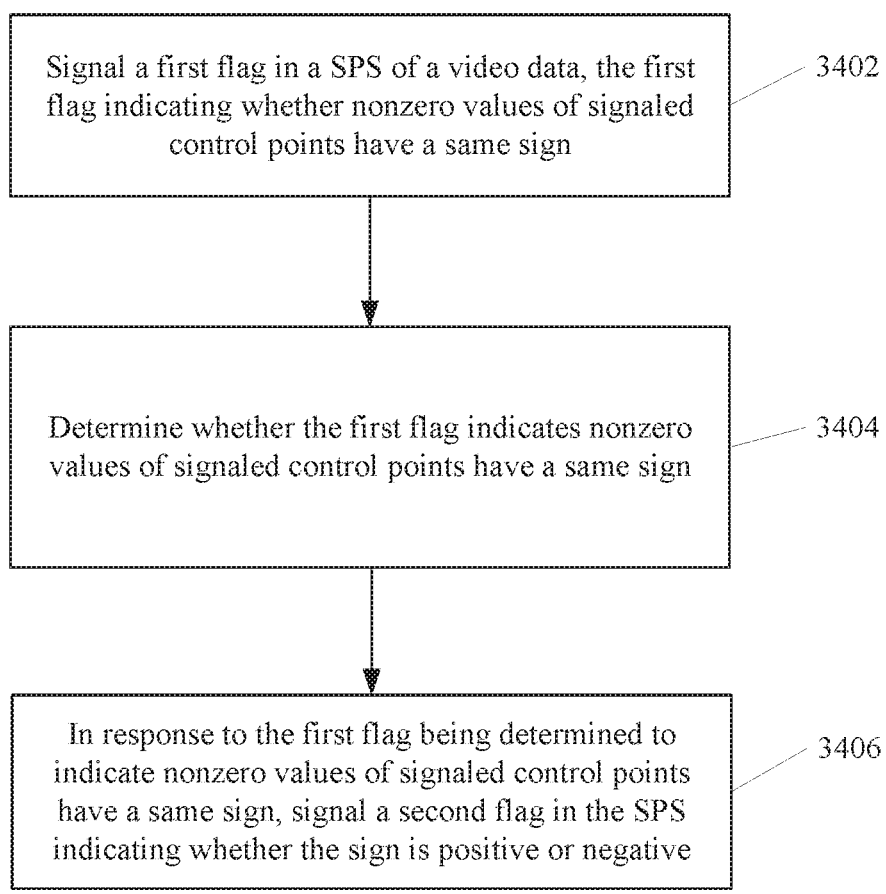
FIG. 34 illustrates a flowchart of a fourth exemplary video processing method, according to some embodiments of the present disclosure.

FIG. 34 illustrates a flowchart of an exemplary video processing method 3400, according to some embodiments of the present disclosure. In some embodiments, method 3400 can be performed by an encoder (e.g., encoder 200 of FIG. 2), a decoder (e.g., decoder 300 of FIG. 3) or performed by one or more software or hardware components of an apparatus (e.g., apparatus 400 of FIG. 4). For example, a processor (e.g., processor 402 of FIG. 4) can perform method 3400. In some embodiments, method 3400 can be implemented by a computer program product, embodied in a computer-readable medium, including computer-executable instructions, such as program code, executed by computers (e.g., apparatus 400 of FIG. 4).

At step 3402, method 3400 can include signaling a first flag in a SPS of a video data. The first flag can indicate whether nonzero values of signaled control points have a same sign. The control points can define a mapping function for a luma-to-chroma QP mapping table.

At step 3404, method 3400 can include determining whether the first flag indicates nonzero values of signaled control points have a same sign. At step 3406, method 3400 can include in response to the first flag being determined to indicate nonzero values of signaled control points have a same sign, signaling a second flag in the SPS indicating whether the sign is positive or negative. In some embodiments, the first flag can be syntax element out_val_cross_sign_flag and the second flag can be syntax element out_val_sign_flag, as described above. For example, syntax element out_val_cross_sign_flag equal to 1 can specify that syntax element qp_out_val_diffin include both positive and negative values, and syntax element out_val_cross_sign_flag equal to 0 can specify that all non-zero qp_out_val_diffin have the same sign. The syntax element out_val_sign_flag can be coded to denote whether non-zero qp_out_val_diffin are positive or negative. For example, syntax element out_val_sign_flag equal to 0 represents the positive value, while syntax element out_val_sign_flag equal to 1 represents the negative value.

Figure 35:
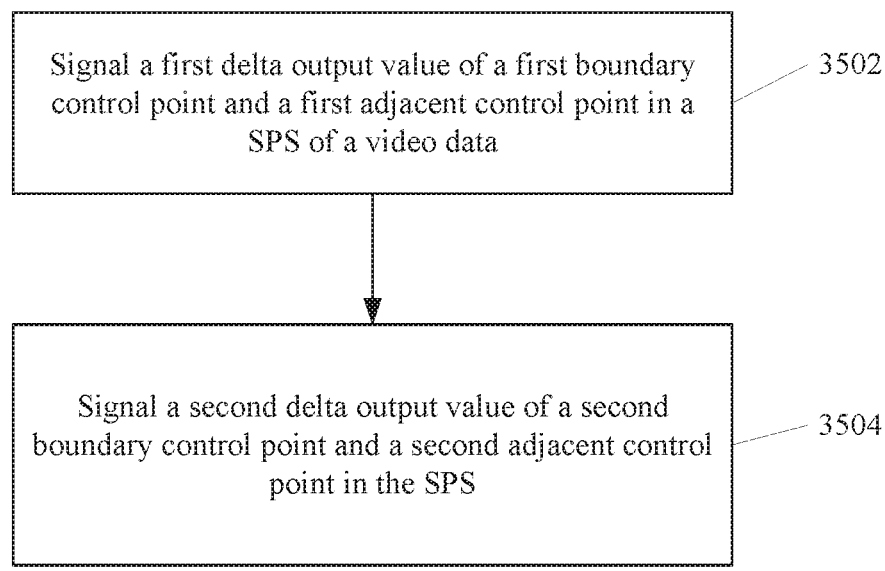
FIG. 35 illustrates a flowchart of a fifth exemplary video processing method, according to some embodiments of the present disclosure.

FIG. 35 illustrates a flowchart of an exemplary video processing method 3500, according to some embodiments of the present disclosure. In some embodiments, method 3500 can be performed by an encoder (e.g., encoder 200 of FIG. 2), a decoder (e.g., decoder 300 of FIG. 3) or performed by one or more software or hardware components of an apparatus (e.g., apparatus 400 of FIG. 4). For example, a processor (e.g., processor 402 of FIG. 4) can perform method 3500. In some embodiments, method 3500 can be implemented by a computer program product, embodied in a computer-readable medium, including computer-executable instructions, such as program code, executed by computers (e.g., apparatus 400 of FIG. 4).

At step 3502, method 3500 can include signaling a first delta output value of a first boundary control point and a first adjacent control point in a SPS of a video data. The first adjacent control point is a control point adjacent to the first boundary control point in a mapping function. The delta output value is a difference between output values of the first boundary control point and the first adjacent control point. The mapping function can define a luma-to-chroma QP mapping table. For example, the first delta output value can be syntax element delta_qp_out_val [i][0] as described above.

At step 3504, method 3500 can include signaling a second delta output value of a second boundary control point and a second adjacent control point in the SPS. The second adjacent control point is a control point adjacent to the second boundary control point in the mapping function. The second delta output value is a difference between output values of the second boundary control point and the second adjacent control point. For example, the second delta output value can be syntax element delta_qp_out_val [i][num_points_in_qp_table_minus1[i]+2] as described above.

Figure 36:
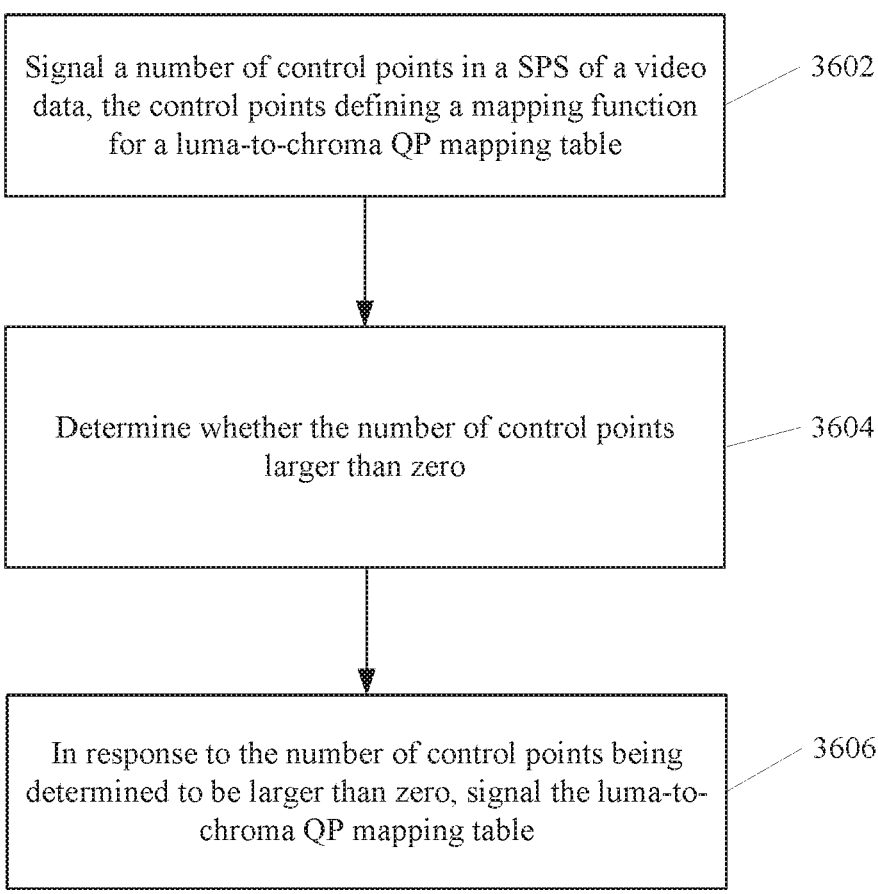
FIG. 36 illustrates a flowchart of a sixth exemplary video processing method, according to some embodiments of the present disclosure.

FIG. 36 illustrates a flowchart of an exemplary video processing method 3600, according to some embodiments of the present disclosure. In some embodiments, method 3600 can be performed by an encoder (e.g., encoder 200 of FIG. 2), a decoder (e.g., decoder 300 of FIG. 3) or performed by one or more software or hardware components of an apparatus (e.g., apparatus 400 of FIG. 4). For example, a processor (e.g., processor 402 of FIG. 4) can perform method 3600. In some embodiments, method 3600 can be implemented by a computer program product, embodied in a computer-readable medium, including computer-executable instructions, such as program code, executed by computers (e.g., apparatus 400 of FIG. 4).

At step 3602, method 3600 can include signaling a number of control points in a SPS of a video data. The control points can define a mapping function for a luma-to-chroma QP mapping table. In some embodiments, the parameter can be syntax element num_points_in_qp_table to indicate the number of signaled control points described above. For example, syntax element num_points_in_qp_table equal to zero can specify that no control point is signaled.

At step 3604, method 3600 can include determining whether the number of control points larger than zero. At step 3606, method 3600 can include in response to the number of control points being determined to be larger than zero, signaling the luma-to-chroma QP mapping table. In addition, the luma-to-chroma QP mapping table can be not signaled in response to the number of control points being determined to be equal to zero. In this case, the control points define a one-piece mapping function for a luma-to-chroma QP mapping table.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A video decoding method, comprising:
receiving a bitstream of video data;
determining whether a luma-to-chroma quantization parameter (QP) mapping table is signaled, based on a first flag in the bitstream; and
in response to the first flag being a first value, determining the signaled luma-to-chroma QP mapping table based on the bitstream.

2. The method according to clause 1, wherein determining the signaled luma-to-chroma QP mapping table based on the bitstream comprises:
determining, based on the bitstream, a signaled mapping function; and
determining the signaled luma-to-chroma QP mapping table based on the signaled mapping function.

3. The method according to clause 2, wherein determining the signaled mapping function comprises:
determining the signaled mapping function based on a control point.

4. The method according to clause 3, further comprising:
determining, based on the bitstream, at least one of a luma input value or a chroma output value associated with the control point.

5. The method according to any one of clauses 1-4, further comprising:
in response to the first flag being a second value, determining a luma-to-chroma QP mapping table based on a default mapping function.

6. The method according to any one of clauses 1-5, wherein determining the signaled luma-to-chroma QP mapping table based on the bitstream comprises:
determining a number of luma-to-chroma QP mapping tables that are signaled in the bitstream, based on a second flag in the bitstream; and in response to the second flag being a third value, determining that the signaled luma-to-chroma QP mapping table applies to both a first chroma component and a second chroma component.

7. The method according to clause 6, further comprising:
in response to the second flag being a fourth value, determining that signaled luma-to-chroma QP mapping table comprises:
a first table applying to the first chroma component, and
a second table applying to the second chroma component.

8. The method according to any one of clauses 6 and 7, wherein:
the first chroma component is a Cb component, and the second chroma component is a Cr component.

9. The method according to any one of clauses 1-8, further comprising:
determining whether a luma-to-chroma QP mapping table for joint CbCr residues is signaled, based on a third flag in the bitstream; and
in response to the third flag being a fifth value, determining the signaled luma-to-chroma QP mapping table for the joint CbCr residues.

10. The method according to any one of clauses 1-9, further comprising:
in response to the third flag being a sixth value, determining a luma-to-chroma QP mapping table for the joint CbCr residues, by averaging a first luma-to-chroma QP mapping table for Cb residues and a second luma-to-chroma QP mapping table for Cr residues.

11. A system for video decoding, comprising:
a memory configured to store instructions; and
one or more processors coupled to the memory and configured to execute the instructions to cause the system to:
receive a bitstream of video data;
determine whether a luma-to-chroma quantization parameter (QP) mapping table is signaled, based on a first flag in the bitstream; and
in response to the first flag being a first value, determine the signaled luma-to-chroma QP mapping table based on the bitstream.

12. The system according to clause 11, wherein the one or more processor are further configured to execute the instructions to cause the system to:
determine, based on the bitstream, a signaled mapping function; and
determine the signaled luma-to-chroma QP mapping table based on the signaled mapping function.

13. The system according to clause 12, wherein the one or more processors are further configured to execute the instructions to cause the system to:
determine the signaled mapping function based on a control point.

14. The system according to clause 13, wherein the one or more processors are further configured to execute the instructions to cause the system to:
determine, based on the bitstream, at least one of a luma input value or a chroma output value associated with the control point.

15. The system according to any one of clauses 11-14, wherein the one or more processors are further configured to execute the instructions to cause the system to: in response to the first flag being a second value, determine a luma-to-chroma QP mapping table based on a default mapping function.

16. The system according to any one of clauses 11-15, wherein the one or more processors are further configured to execute the instructions to cause the system to:
determine a number of luma-to-chroma QP mapping tables that are signaled in the bitstream, based on a second flag in the bitstream; and
in response to the second flag being a third value, determine that the signaled luma-to-chroma QP mapping table applies to both a first chroma component and a second chroma component.

17. The system according to clause 16, wherein the one or more processors are further configured to execute the instructions to cause the system to:
in response to the second flag being a fourth value, determine that signaled luma-to-chroma QP mapping table comprises:
a first table applying to the first chroma component, and
a second table applying to the second chroma component.

18. The system according to any one of clauses 16 and 17, wherein:
the first chroma component is a Cb component, and the second chroma component is a Cr component.

19. The system according to any one of clauses 11-18, wherein the one or more processors are further configured to execute the instructions to cause the system to:
determine whether a luma-to-chroma QP mapping table for joint CbCr residues is signaled, based on a third flag in the bitstream; and
in response to the third flag being a fifth value, determine the signaled luma-to-chroma QP mapping table for the joint CbCr residues.

20. The system according to any one of clauses 11-19, wherein the one or more processors are further configured to execute the instructions to cause the system to:
in response to the third flag being a sixth value, determine a luma-to-chroma QP mapping table for the joint CbCr residues, by averaging a first luma-to-chroma QP mapping table for Cb residues and a second luma-to-chroma QP mapping table for Cr residues.

21. A non-transitory computer-readable storage medium storing a set of instructions that are executable by one or more processors of a device to cause the device to perform:
receiving a bitstream of video data;
determining whether a luma-to-chroma quantization parameter (QP) mapping table is signaled, based on a first flag in the bitstream; and
in response to the first flag being a first value, determining the signaled luma-to-chroma QP mapping table based on the bitstream.

22. The non-transitory computer-readable storage medium according to clause 21, wherein determining the signaled luma-to-chroma QP mapping table based on the bitstream comprises:
determining, based on the bitstream, a signaled mapping function; and
determining the signaled luma-to-chroma QP mapping table based on the signaled mapping function.

23. The non-transitory computer-readable storage medium according to clause 22, wherein determining the signaled mapping function comprises:
determining the signaled mapping function based on a control point.

24. The non-transitory computer-readable storage medium according to clause 23, wherein the set of instructions that are executable by the one or more processors to cause the device to further perform:
determining, based on the bitstream, at least one of a luma input value or a chroma output value associated with the control point.

25. The non-transitory computer-readable storage medium according to any one of clauses 21-24, wherein the set of instructions that are executable by the one or more processors to cause the device to further perform:

in response to the first flag being a second value, determining a luma-to-chroma QP mapping table based on a default mapping function.

26. The non-transitory computer-readable storage medium according to any one of clauses 21-25, wherein determining the signaled luma-to-chroma QP mapping table based on the bitstream comprises:

determining a number of luma-to-chroma QP mapping tables that are signaled in the bitstream, based on a second flag in the bitstream; and in response to the second flag being a third value, determining that the signaled luma-to-chroma QP mapping table applies to both a first chroma component and a second chroma component.

27. The non-transitory computer-readable storage medium according to clause 26, wherein the set of instructions that are executable by the one or more processors to cause the device to further perform:

in response to the second flag being a fourth value, determining that signaled luma-to-chroma QP mapping table comprises:
  a first table applying to the first chroma component, and
  a second table applying to the second chroma component.

28. The non-transitory computer-readable storage medium according to any one of clauses 26 and 27, wherein:
  the first chroma component is a Cb component, and the second chroma component is a Cr component.

29. The non-transitory computer-readable storage medium according to any one of clauses 21-28, wherein the set of instructions that are executable by the one or more processors to cause the device to further perform:

determining whether a luma-to-chroma QP mapping table for joint CbCr residues is signaled, based on a third flag in the bitstream; and in response to the third flag being a fifth value, determining the signaled luma-to-chroma QP mapping table for the joint CbCr residues.

30. The non-transitory computer-readable storage medium according to any one of clauses 21-29, wherein the set of instructions that are executable by the one or more processors to cause the device to further perform:

in response to the third flag being a sixth value, determining a luma-to-chroma QP mapping table for the joint CbCr residues, by averaging a first luma-to-chroma QP mapping table for Cb residues and a second luma-to-chroma QP mapping table for Cr residues.

31. A video decoding method, comprising:
receiving a bitstream of video data;
determining, based on the bitstream, a difference between an input value of a control point and an output value of the control point, the control point defining a mapping function for a luma-to-chroma quantization parameter (QP) mapping table;
determining the output value of the control point, based on the input value and the difference; and
determining the mapping function based on the output value of the control point.

32. A video decoding method, comprising:
receiving a bitstream of video data;
determining, based on the bitstream, a difference between a delta input value and a delta output value, wherein the delta input value is a difference between input values of two control points defining a mapping function for a luma-to-chroma quantization parameter (QP) mapping table, and the delta output value is a difference between output values of the two control points;
determining the output values of the two control points, based on the difference between the delta input value and the delta output value; and
determining the mapping function based on the output values of the two control points.

33. A video decoding method, comprising:
receiving a bitstream of video data;
determining, based on a first flag in the bitstream, whether nonzero values of signaled control points have a same sign, the control points defining a mapping function for a luma-to-chroma quantization parameter (QP) mapping table; and
in response to the first flag being a first value, determining that the nonzero values of the signaled control points have the same sign.

34. The method according to clause 33, further comprising:
in response to the nonzero values of the signaled control points being determined to have the same sign, determining, based on a second flag in the bitstream, whether the sign is positive or negative.

35. A video decoding method, comprising:
receiving a bitstream of video data:
determining, based on the bitstream, an output value of a boundary point of a mapping function, the mapping function defining a luma-to-chroma quantization parameter (QP) mapping table; and
determining the mapping function based on the output value of the boundary point.

36. The method according to clause 35, further comprising:
determining an input value of the boundary point based on a default value; and
determining the mapping function based on the input value of the boundary point.

37. The method according to any of clauses 31-36, further comprising:
determining whether the luma-to-chroma QP mapping table is signaled, based on a table-present flag in the bitstream; and
in response to the table-present flag being a first value, determining the signaled luma-to-chroma QP mapping table based on the mapping function.

38. The method according to clause 37, further comprising:
in response to the table-present flag being a second value, determining a luma-to-chroma QP mapping table based on a default mapping function.

39. A system for video decoding, comprising:
a memory configured to store instructions; and
one or more processors coupled to the memory and configured to execute the instructions to cause the system to:
  receive a bitstream of video data;
  determine, based on the bitstream, a difference between an input value of a control point and an output value of the control point, the control point defining a mapping function for a luma-to-chroma quantization parameter (QP) mapping table;
  determine the output value of the control point, based on the input value and the difference; and
  determine the mapping function based on the output value of the control point.

40. A system for video decoding, comprising:
a memory configured to store instructions; and
one or more processors coupled to the memory and configured to execute the instructions to cause the system to:
receive a bitstream of video data;
determine, based on the bitstream, a difference between a delta input value and a delta output value, wherein the delta input value is a difference between input values of two control points defining a mapping function for a luma-to-chroma quantization parameter (QP) mapping table, and the delta output value is a difference between output values of the two control points;
determine the output values of the two control points, based on the difference between the delta input value and the delta output value; and
determine the mapping function based on the output values of the two control points.

41. A system for video decoding, comprising:
a memory configured to store instructions; and
one or more processors coupled to the memory and configured to execute the instructions to cause the system to:
receive a bitstream of video data;
determine, based on a first flag in the bitstream, whether nonzero values of signaled control points have a same sign, the control points defining a mapping function for a luma-to-chroma quantization parameter (QP) mapping table; and
in response to the first flag being a first value, determine that the nonzero values of the signaled control points have the same sign.

42. The system according to clause 41, wherein the one or more processors are further configured to execute the instructions to cause the system to:
in response to the nonzero values of the signaled control points being determined to have the same sign, determine, based on a second flag in the bitstream, whether the sign is positive or negative.

43. A system for video decoding, comprising:
a memory configured to store instructions; and
one or more processors coupled to the memory and configured to execute the instructions to cause the system to:
receive a bitstream of video data;
determine, based on the bitstream, an output value of a boundary point of a mapping function, the mapping function defining a luma-to-chroma quantization parameter (QP) mapping table; and
determine the mapping function based on the output value of the boundary point.

44. The system according to clause 43, wherein the one or more processors are further configured to execute the instructions to cause the system to:
determine an input value of the boundary point based on a default value; and
determine the mapping function based on the input value of the boundary point.

45. The system according to any of clauses 39-44, wherein the one or more processors are further configured to execute the instructions to cause the system to:
determine whether the luma-to-chroma QP mapping table is signaled, based on a table-present flag in the bitstream; and
in response to the table-present flag being a first value, determine the signaled luma-to-chroma QP mapping table based on the mapping function.

46. The system according to clause 45, wherein the one or more processors are further configured to execute the instructions to cause the system to:
in response to the table-present flag being a second value, determine a luma-to-chroma QP mapping table based on a default mapping function.

47. A non-transitory computer-readable storage medium storing a set of instructions that are executable by one or more processors of a device to cause the device to perform:
receiving a bitstream of video data;
determining, based on the bitstream, a difference between an input value of a control point and an output value of the control point, the control point defining a mapping function for a luma-to-chroma quantization parameter (QP) mapping table;
determining the output value of the control point, based on the input value and the difference; and
determining the mapping function based on the output value of the control point.

48. A non-transitory computer-readable storage medium storing a set of instructions that are executable by one or more processors of a device to cause the device to perform:
receiving a bitstream of video data;
determining, based on the bitstream, a difference between a delta input value and a delta output value, wherein the delta input value is a difference between input values of two control points defining a mapping function for a luma-to-chroma quantization parameter (QP) mapping table, and the delta output value is a difference between output values of the two control points;
determining the output values of the two control points, based on the difference between the delta input value and the delta output value; and
determining the mapping function based on the output values of the two control points.

49. A non-transitory computer-readable storage medium storing a set of instructions that are executable by one or more processors of a device to cause the device to perform:
receiving a bitstream of video data;
determining, based on a first flag in the bitstream, whether nonzero values of signaled control points have a same sign, the control points defining a mapping function for a luma-to-chroma quantization parameter (QP) mapping table; and
in response to the first flag being a first value, determining that the nonzero values of the signaled control points have the same sign.

50. The non-transitory computer-readable storage medium according to clause 49, wherein the set of instructions that are executable by the one or more processors to cause the device to further perform:
in response to the nonzero values of the signaled control points being determined to have the same sign, determining, based on a second flag in the bitstream, whether the sign is positive or negative.

51. A non-transitory computer-readable storage medium storing a set of instructions that are executable by one or more processors of a device to cause the device to perform:
receiving a bitstream of video data;
determining, based on the bitstream, an output value of a boundary point of a mapping function, the mapping function defining a luma-to-chroma quantization parameter (QP) mapping table; and determining the mapping function based on the output value of the boundary point.

52. The non-transitory computer-readable storage medium according to clause 51, wherein the set of instructions that are executable by the one or more processors to cause the device to further perform:
determining an input value of the boundary point based on a default value; and
determining the mapping function based on the input value of the boundary point.
53. The non-transitory computer-readable storage medium according to any of clauses 47-52, wherein the set of instructions that are executable by the one or more processors to cause the device to further perform:
determining whether the luma-to-chroma QP mapping table is signaled, based on a table-present flag in the bitstream; and
in response to the table-present flag being a first value, determining the signaled luma-to-chroma QP mapping table based on the mapping function.
54. The non-transitory computer-readable storage medium according to clause 53, wherein the set of instructions that are executable by the one or more processors to cause the device to further perform:
in response to the table-present flag being a second value, determining a luma-to-chroma QP mapping table based on a default mapping function.
55. A video decoding method, comprising:
receiving a bitstream of video data;
determining, based on a parameter in the bitstream, a number of control points signaled by the bitstream, the control points defining a mapping function for a luma-to-chroma quantization parameter (QP) mapping table, and
in response to the parameter indicating that no control point is signaled, determining a one-piece mapping function.
56. A system for video decoding, comprising:
a memory configured to store instructions; and
one or more processors coupled to the memory and configured to execute the instructions to cause the system to:
receive a bitstream of video data;
determine, based on a parameter in the bitstream, a number of control points signaled by the bitstream, the control points defining a mapping function for a luma-to-chroma quantization parameter (QP) mapping table, and
in response to the parameter indicating that no control point is signaled, determine a one-piece mapping function.
57. A non-transitory computer-readable storage medium storing a set of instructions that are executable by one or more processors of a device to cause the device to perform:
receiving a bitstream of video data;
determining, based on a parameter in the bitstream, a number of control points signaled by the bitstream, the control points defining a mapping function for a luma-to-chroma quantization parameter (QP) mapping table, and
in response to the parameter indicating that no control point is signaled, determining a one-piece mapping function.
58. A video processing method, comprising:
signaling a first flag indicating whether a luma-to-chroma quantization parameter (QP) mapping table is signaled in a Sequence Parameter Set (SPS) of a video data;
determining whether the first flag indicates the luma-to-chroma QP mapping table is signaled; and
in response to the first flag being determined to indicate the luma-to-chroma QP mapping table is signaled, signaling the luma-to-chroma QP mapping table.
59. The method according to clause 58, wherein the luma-to-chroma QP mapping table is determined based on a default mapping function in response to the first flag being determined to indicate the luma-to-chroma QP mapping table is not signaled.
60. The method according to any one of clauses 58 and 59, further comprising:
in response to the first flag being determined to indicate the luma-to-chroma QP mapping table is signaled, signaling a second flag indicating whether one luma-to-chroma QP mapping table for a Cb component and a Cr component is signaled or a first luma-to-chroma QP mapping table for the Cb component and a second luma-to-chroma QP mapping table for the Cr component are signaled.
61. The method according to clause 60, further comprising:
in response to the first flag being determined to indicate the luma-to-chroma QP mapping table is signaled, signaling a third flag indicating whether a luma-to-chroma QP mapping table for joint CbCr residues is signaled.
62. The method according to clause 61, wherein the luma-to-chroma QP mapping table for joint CbCr residues is determined based on the luma-to-chroma QP mapping tables for Cb residues and for Cr residues in response to the third flag being determined to indicate the luma-to-chroma QP mapping table for joint CbCr residues is not signaled.
63. A system for video processing, comprising:
a memory configured to store instructions; and
one or more processors coupled to the memory and configured to execute the instructions to cause the system to:
signal a first flag indicating whether a luma-to-chroma quantization parameter (QP) mapping table is signaled in a Sequence Parameter Set (SPS) of a video data;
determine whether the first flag indicates the luma-to-chroma QP mapping table is signaled; and
in response to the first flag being determined to indicate the luma-to-chroma QP mapping table is signaled, signal the luma-to-chroma QP mapping table.
64. The system according to clause 63, wherein the luma-to-chroma QP mapping table is determined based on a default mapping function in response to the first flag being determined to indicate the luma-to-chroma QP mapping table is not signaled.
65. The system according to any one of clauses 63 and 64, wherein the one or more processor are further configured to execute the instructions to cause the system to:
in response to the first flag being determined to indicate the luma-to-chroma QP mapping table is signaled, signal a second flag indicating whether one luma-to-chroma QP mapping table for a Cb component and a Cr component is signaled or a first luma-to-chroma QP mapping table for the Cb component and a second luma-to-chroma QP mapping table for the Cr component are signaled.
66. The system according to clause 65, wherein the one or more processor are further configured to execute the instructions to cause the system to:
in response to the first flag being determined to indicate the luma-to-chroma QP mapping table is signaled, signal a third flag indicating whether a luma-to-chroma QP mapping table for joint CbCr residues is signaled.
67. The system according to clause 66, wherein the luma-to-chroma QP mapping table for joint CbCr residues is determined based on the luma-to-chroma QP mapping tables for Cb residues and for Cr residues in response to the third flag being determined to indicate the luma-to-chroma QP mapping table for joint CbCr residues is not signaled.
68. A non-transitory computer-readable storage medium storing a set of instructions that are executable by one or more processors of a device to cause the device to perform:

signaling a first flag indicating whether a luma-to-chroma quantization parameter (QP) mapping table is signaled in a Sequence Parameter Set (SPS) of a video data;

determining whether the first flag indicates the luma-to-chroma QP mapping table is signaled; and in response to the first flag being determined to indicate the luma-to-chroma QP mapping table is signaled, signaling the luma-to-chroma QP mapping table.

69. The non-transitory computer-readable storage medium according to clause 68, wherein the luma-to-chroma QP mapping table is determined based on a default mapping function in response to the first flag being determined to indicate the luma-to-chroma QP mapping table is not signaled.

70. The non-transitory computer-readable storage medium according to any one of clauses 68 and 69, wherein the set of instructions that are executable by the one or more processors to cause the device to further perform:

in response to the first flag being determined to indicate the luma-to-chroma QP mapping table is signaled, signaling a second flag indicating whether one luma-to-chroma QP mapping table for a Cb component and a Cr component is signaled or a first luma-to-chroma QP mapping table for the Cb component and a second luma-to-chroma QP mapping table for the Cr component are signaled.

71. The non-transitory computer-readable storage medium according to clause 70, wherein the set of instructions that are executable by the one or more processors to cause the device to further perform:

in response to the first flag being determined to indicate the luma-to-chroma QP mapping table is signaled, signaling a third flag indicating whether a luma-to-chroma QP mapping table for joint CbCr residues is signaled.

72. The non-transitory computer-readable storage medium according to clause 71, wherein the luma-to-chroma QP mapping table for joint CbCr residues is determined based on the luma-to-chroma QP mapping tables for Cb residues and for Cr residues in response to the third flag being determined to indicate the luma-to-chroma QP mapping table for joint CbCr residues is not signaled.

73. A video processing method, comprising:

signaling a delta input value of a first control point and a second control point in a Sequence Parameter Set (SPS) of a video data, wherein the delta input value is a difference between input values of the first and second control points defining a mapping function for a luma-to-chroma quantization parameter (QP) mapping table; and signaling a difference between an input value of the second control point and an output value of the second control point in the SPS.

74. A video processing method, comprising:

signaling a delta input value of a first control point and a second control point in a Sequence Parameter Set (SPS) of a video data, wherein the delta input value is a difference between input values of the first and second control points defining a mapping function for a luma-to-chroma quantization parameter (QP) mapping table; and signaling a difference between the delta input value and a delta output value of the first and second control points, wherein the delta output value is a difference between output values of the first and second control points.

75. A video processing method, comprising:

signaling a first flag in a Sequence Parameter Set (SPS) of a video data, the first flag indicating whether nonzero values of signaled control points have a same sign, the control points defining a mapping function for a luma-to-chroma quantization parameter (QP) mapping table;

determining whether the first flag indicates nonzero values of signaled control points have a same sign; and in response to the first flag being determined to indicate nonzero values of signaled control points have a same sign, signaling a second flag in the SPS indicating whether the sign is positive or negative.

76. A video processing method, comprising:

signaling a first delta output value of a first boundary control point and a first adjacent control point in a Sequence Parameter Set (SPS) of a video data, wherein the first adjacent control point is a control point adjacent to the first boundary control point in a mapping function, the delta output value is a difference between output values of the first boundary control point and the first adjacent control point, and the mapping function defines a luma-to-chroma quantization parameter (QP) mapping table; and signaling a second delta output value of a second boundary control point and a second adjacent control point in the SPS, wherein the second adjacent control point is a control point adjacent to the second boundary control point in the mapping function, the second delta output value is a difference between output values of the second boundary control point and the second adjacent control point.

77. A system for video processing, comprising:

a memory configured to store instructions; and one or more processors coupled to the memory and configured to execute the instructions to cause the system to:

signal a delta input value of a first control point and a second control point in a Sequence Parameter Set (SPS) of a video data, wherein the delta input value is a difference between input values of the first and second control points defining a mapping function for a luma-to-chroma quantization parameter (QP) mapping table; and signal a difference between an input value of the second control point and an output value of the second control point in the SPS.

78. A system for video processing, comprising:

a memory configured to store instructions; and one or more processors coupled to the memory and configured to execute the instructions to cause the system to:

signal a delta input value of a first control point and a second control point in a Sequence Parameter Set (SPS) of a video data, wherein the delta input value is a difference between input values of the first and second control points defining a mapping function for a luma-to-chroma quantization parameter (QP) mapping table; and signal a difference between the delta input value and a delta output value of the first and second control points, wherein the delta output value is a difference between output values of the first and second control points.

79. A system video processing, comprising:

a memory configured to store instructions; and one or more processors coupled to the memory and configured to execute the instructions to cause the system to:

signal a first flag in a Sequence Parameter Set (SPS) of a video data, the first flag indicating whether nonzero values of signaled control points have a same sign, the control points defining a mapping function for a luma-to-chroma quantization parameter (QP) mapping table;

determine whether the first flag indicates nonzero values of signaled control points have a same sign; and in response to the first flag being determined to indicate nonzero values of signaled control points have a same sign, signal a second flag in the SPS indicating whether the sign is positive or negative.

80. A system for video processing, comprising:
a memory configured to store instructions; and
one or more processors coupled to the memory and configured to execute the instructions to cause the system to:
signal a first delta output value of a first boundary control point and a first adjacent control point in a Sequence Parameter Set (SPS) of a video data, wherein the first adjacent control point is adjacent to the first boundary control point in a mapping function, the delta output value is a difference between output values of the first boundary control point and the first adjacent control point, and the mapping function defines a luma-to-chroma quantization parameter (QP) mapping table; and
signaling a second delta output value of a second boundary control point and a second adjacent control point in the SPS, wherein the second adjacent control point is adjacent to the second boundary control point in the mapping function, the second delta output value is a difference between output values of the second boundary control point and the second adjacent control point.

81. A non-transitory computer-readable storage medium storing a set of instructions that are executable by one or more processors of a device to cause the device to perform:
signaling a delta input value of a first control point and a second control point in a Sequence Parameter Set (SPS) of a video data, wherein the delta input value is a difference between input values of the first and second control points defining a mapping function for a luma-to-chroma quantization parameter (QP) mapping table; and
signaling a difference between an input value of the second control point and an output value of the second control point in the SPS.

82. A non-transitory computer-readable storage medium storing a set of instructions that are executable by one or more processors of a device to cause the device to perform:
signaling a delta input value of a first control point and a second control point in a Sequence Parameter Set (SPS) of a video data, wherein the delta input value is a difference between input values of the first and second control points defining a mapping function for a luma-to-chroma quantization parameter (QP) mapping table; and
signaling a difference between the delta input value and a delta output value of the first and second control points, wherein the delta output value is a difference between output values of the first and second control points.

83. A non-transitory computer-readable storage medium storing a set of instructions that are executable by one or more processors of a device to cause the device to perform:
signaling a first flag in a Sequence Parameter Set (SPS) of a video data, the first flag indicating whether nonzero values of signaled control points have a same sign, the control points defining a mapping function for a luma-to-chroma quantization parameter (QP) mapping table;
determining whether the first flag indicates nonzero values of signaled control points have a same sign; and
in response to the first flag being determined to indicate nonzero values of signaled control points have a same sign, signaling a second flag in the SPS indicating whether the sign is positive or negative.

84. A non-transitory computer-readable storage medium storing a set of instructions that are executable by one or more processors of a device to cause the device to perform:
signaling a first delta output value of a first boundary control point and a first adjacent control point in a Sequence Parameter Set (SPS) of a video data, wherein the first adjacent control point is adjacent to the first boundary control point in a mapping function, the delta output value is a difference between output values of the first boundary control point and the first adjacent control point, and the mapping function defines a luma-to-chroma quantization parameter (QP) mapping table; and
signaling a second delta output value of a second boundary control point and a second adjacent control point in the SPS, wherein the second adjacent control point is adjacent to the second boundary control point in the mapping function, the second delta output value is a difference between output values of the second boundary control point and the second adjacent control point.

85. A video processing method, comprising:
signaling a number of control points in a Sequence Parameter Set (SPS) of a video data, the control points defining a mapping function for a luma-to-chroma quantization parameter (QP) mapping table;
determining whether the number of control points larger than zero; and
in response to the number of control points being determined to be larger than zero, signaling the luma-to-chroma QP mapping table,
wherein the luma-to-chroma QP mapping table is not signaled in response to the number of control points being determined to be equal to zero.

86. A system for video processing, comprising:
a memory configured to store instructions; and
one or more processors coupled to the memory and configured to execute the instructions to cause the system to:
signal a number of control points in a Sequence Parameter Set (SPS) of a video data, the control points defining a mapping function for a luma-to-chroma quantization parameter (QP) mapping table;
determine whether the number of control points larger than zero; and
in response to the number of control points being determined to be larger than zero, signal the luma-to-chroma QP mapping table,
wherein the luma-to-chroma QP mapping table is not signaled in response to the number of control points being determined to be equal to zero.

87. A non-transitory computer-readable storage medium storing a set of instructions that are executable by one or more processors of a device to cause the device to perform:
signaling a number of control points in a Sequence Parameter Set (SPS) of a video data, the control points defining a mapping function for a luma-to-chroma quantization parameter (QP) mapping table;
determining whether the number of control points larger than zero; and
in response to the number of control points being determined to be larger than zero, signaling the luma-to-chroma QP mapping table,
wherein the luma-to-chroma QP mapping table is not signaled in response to the number of control points being determined to be equal to zero.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art can also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video decoding method, comprising:
    determining, based on a first flag, whether one or more luma-to-chroma quantization parameter (QP) mapping tables are signaled in a Sequence Parameter Set (SPS);
    in response to the first flag being a first value, determining the one or more luma-to-chroma QP mapping tables based on a second flag and a third flag; and
    in response to the first flag being a second value, determining the one or more luma-to-chroma QP mapping tables based on one or more default tables,
    wherein
        the second flag indicates whether a luma-to-chroma QP mapping table for both Cb and Cr components is signaled in the SPS, and
        the third flag indicates whether a luma-to-chroma QP mapping table for joint CbCr residues is signaled in the SPS,
            in response to the third flag being a fifth value, signaling the luma-to-chroma QP mapping table for the joint CbCr residues in the SPS; and
            in response to the third flag being a sixth value, determining the luma-to-chroma QP mapping table for the joint CbCr residues by averaging a first luma-to-chroma QP mapping table for Cb residues and a second luma-to-chroma QP mapping table for Cr residues.

2. The method according to claim 1, wherein determining the one or more luma-to-chroma QP mapping tables based on the second and third flags comprises:
    determining a mapping function signaled in the SPS; and
    determining the one or more luma-to-chroma QP mapping tables based on the signaled mapping function.

3. The method according to claim 2, wherein determining the signaled mapping function comprises:
    determining the signaled mapping function based on a control point.

4. The method according to claim 3, further comprising:
    determining, based on the SPS, at least one of a luma input value or a chroma output value associated with the control point.

5. The method according to claim 1, wherein determining the one or more luma-to-chroma QP mapping tables based on one or more default tables comprises:
    determining a luma-to-chroma QP mapping table based on a default mapping function.

6. The method according to claim 1, further comprising:
    in response to the second flag being a third value, signaling the luma-to-chroma QP mapping table for both Cb and Cr components in the SPS.

7. The method according to claim 6, further comprising:
    in response to the second flag being a fourth value, determining:
        a first luma-to-chroma QP mapping table applying to the Cb component is signaled in the SPS, and
        a second luma-to-chroma QP mapping table applying to the Cr component is signaled in the SPS.

8. A system for video decoding, comprising:
    a memory configured to store instructions; and
    one or more processors coupled to the memory and configured to execute the instructions to cause the system to:
        determine, based on a first flag, whether one or more luma-to-chroma quantization parameter (QP) mapping tables are signaled in a Sequence Parameter Set (SPS); and
        in response to the first flag being a first value, determine the one or more luma-to-chroma QP mapping tables based on a second flag and a third flag,
    wherein
        the second flag indicates whether a luma-to-chroma QP mapping table for both Cb and Cr components is signaled in the SPS, and
        the third flag indicates whether a luma-to-chroma QP mapping table for joint CbCr residues is signaled in the SPS,
            in response to the third flag being a fifth value, signaling the luma-to-chroma QP mapping table for the joint CbCr residues in the SPS; and
            in response to the third flag being a sixth value, determining the luma-to-chroma QP mapping table for the joint CbCr residues by averaging a first luma-to-chroma QP mapping table for Cb residues and a second luma-to-chroma QP mapping table for Cr residues.

9. The system according to claim 8, wherein the one or more processors are further configured to execute the instructions to cause the system to:
determine a mapping function signaled in the SPS; and
determine the one or more luma-to-chroma QP mapping tables based on the signaled mapping function.

10. The system according to claim 8, wherein the one or more processors are further configured to execute the instructions to cause the system to:
in response to the first flag being a second value, determine a luma-to-chroma QP mapping table based on a default mapping function.

11. The system according to claim 8, wherein the one or more processors are further configured to execute the instructions to cause the system to:
in response to the second flag being a third value, determine signaling the luma-to-chroma QP mapping table for both Cb and Cr components is signaled in the SPS.

12. A non-transitory computer-readable storage medium storing a set of instructions that are executable by one or more processors of a device to cause the device to perform:
determining, based on a first flag, whether one or more luma-to-chroma quantization parameter (QP) mapping tables are signaled in a Sequence Parameter Set (SPS); and
in response to the first flag being a first value, determining the one or more luma-to-chroma QP mapping tables based on a second flag and a third flag,
wherein
the second flag indicates whether a luma-to-chroma QP mapping table for both Cb and Cr components is signaled in the SPS, and
the third flag indicates whether a luma-to-chroma QP mapping table for joint CbCr residues is signaled in the SPS,
in response to the third flag being a fifth value, signaling the luma-to-chroma QP mapping table for the joint CbCr residues in the SPS; and
in response to the third flag being a sixth value, determining the luma-to-chroma QP mapping table for the joint CbCr residues by averaging a first luma-to-chroma QP mapping table for Cb residues and a second luma-to-chroma QP mapping table for Cr residues.

13. The non-transitory computer-readable storage medium according to claim 12, wherein one or more luma-to-chroma QP mapping tables based on the second and third flags comprises:
determining a mapping function signaled in the SPS; and
determining the one or more luma-to-chroma QP mapping tables based on the signaled mapping function.

14. The non-transitory computer-readable storage medium according to claim 12, wherein the set of instructions that are executable by the one or more processors to cause the device to further perform:
in response to the first flag being a second value, determining a luma-to-chroma QP mapping table based on a default mapping function.

15. The non-transitory computer-readable storage medium according to claim 12, wherein determining the set of instructions that are executable by the one or more processors to cause the device to further perform:
in response to the second flag being a third value, signaling the luma-to-chroma QP mapping table for both Cb and Cr components in the SPS.

* * * * *